(12) United States Patent
Solomon et al.

(10) Patent No.: US 10,759,989 B2
(45) Date of Patent: Sep. 1, 2020

(54) TEMPERATURE-STABLE PARAFFIN INHIBITOR COMPOSITIONS

(71) Applicant: Ecolab USA Inc., St. Paul, MN (US)

(72) Inventors: Kim R. Solomon, River Falls, WI (US); David Fouchard, Sugar Land, TX (US); Thomas O. Painter, Rosenberg, TX (US); Jennifer Stokes, St. Paul, MN (US); Kousik Kundu, Houston, TX (US); Carter Silvernail, Burnsville, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/399,025

(22) Filed: Jan. 5, 2017

(65) Prior Publication Data

US 2017/0190949 A1  Jul. 6, 2017

Related U.S. Application Data

(60) Provisional application No. 62/275,339, filed on Jan. 6, 2016.

(51) Int. Cl.
*C09K 8/524* (2006.01)
*C10G 29/22* (2006.01)
*C10G 75/04* (2006.01)

(52) U.S. Cl.
CPC .............. *C09K 8/524* (2013.01); *C10G 29/22* (2013.01); *C10G 75/04* (2013.01)

(58) Field of Classification Search
None
See application file for complete search history.

(56) References Cited

U.S. PATENT DOCUMENTS

| | | | |
|---|---|---|---|
| 2,981,684 A | 4/1961 | Barnes et al. | |
| 3,329,658 A | 7/1967 | Fields | |
| 3,378,488 A | 4/1968 | Nimerick | |
| 3,419,368 A | 12/1968 | Leas | |
| 3,770,055 A | 11/1973 | Larsen | |
| 4,110,283 A | 8/1978 | Capelle | |
| 4,663,491 A | 5/1987 | Barthell et al. | |
| 4,670,516 A | 6/1987 | Sackmann et al. | |
| 4,900,331 A | 2/1990 | Le | |
| 4,906,682 A | 3/1990 | Mueller et al. | |
| 4,964,468 A | 10/1990 | Adams et al. | |
| 5,336,441 A | 8/1994 | Shah et al. | |
| 5,721,201 A | 2/1998 | Tomassen et al. | |
| 5,725,610 A | 5/1998 | Vassilakis et al. | |
| 5,756,004 A | 5/1998 | Brezinski | |
| 5,851,429 A | 12/1998 | Magyar | |
| 6,260,620 B1 | 7/2001 | Furman et al. | |
| 6,309,431 B1 | 10/2001 | Becker et al. | |
| 6,488,868 B1 | 12/2002 | Meyer | |
| 6,783,582 B2 | 8/2004 | Goldman | |
| 7,057,050 B2 | 6/2006 | Meyer | |
| 7,332,459 B2 | 2/2008 | Collins et al. | |
| 7,338,541 B2 | 3/2008 | Connor et al. | |
| 7,449,429 B2 | 11/2008 | Goldman | |
| 9,080,120 B2 | 7/2015 | Adams et al. | |
| 9,090,849 B2 | 7/2015 | Adamczewska et al. | |
| 9,120,885 B2 | 9/2015 | Castro Sotelo et al. | |
| 9,493,716 B2 | 11/2016 | Burgazil et al. | |
| 2002/0166995 A1 | 11/2002 | Robinson et al. | |
| 2002/0193644 A1* | 12/2002 | Feustel .................. | C10G 21/00 585/1 |
| 2004/0110877 A1 | 6/2004 | Becker | |
| 2007/0213231 A1 | 9/2007 | Jennings | |
| 2007/0221539 A1 | 9/2007 | Cohrs et al. | |
| 2008/0078549 A1* | 4/2008 | Moorehead .............. | C09K 8/74 166/282 |
| 2010/0130385 A1 | 5/2010 | Guzmann et al. | |
| 2013/0156638 A1 | 6/2013 | Hellberg et al. | |
| 2014/0165457 A1 | 6/2014 | Castro et al. | |
| 2014/0273150 A1 | 9/2014 | Angel | |
| 2015/0038470 A1 | 2/2015 | Keasler et al. | |

(Continued)

FOREIGN PATENT DOCUMENTS

| | | |
|---|---|---|
| CN | 103614128 A | 3/2014 |
| RU | 2014347 C1 | 6/1994 |
| WO | 0104238 A1 | 1/2001 |
| WO | 03/042428 A1 | 5/2003 |
| WO | 2005098200 A2 | 10/2005 |
| WO | 2012013432 A1 | 2/2012 |

OTHER PUBLICATIONS

International Search Report for International Application No. PCT/US2017/012260, dated Apr. 2, 2017, 3 pages.
Written Opinion for International Application No. PCT/US2017/012260 dated Apr. 2, 2017, 6 pages.
Eastman Chemical Company, "Plasticizer formulation selector guide", Technical Tip, 4 pages, (2014).
Hallstar, Ester Plasticizers for Elastomers, Hallstar Elastomer Brochure, 26 pages (2013).
Hallstar, "Plasticizer/Polymer Polarity Chart," 4 pages.

(Continued)

*Primary Examiner* — Vishal V Vasisth
(74) *Attorney, Agent, or Firm* — Kagan Binder, PLLC

(57) ABSTRACT

Disclosed are compositions including up to 20 wt % of a paraffin inhibiting polymer and a non-polymeric ester compound, wherein the compositions flow at a temperature between about 0° C. and −40° C., or between about −20° C. and −40° C. The non-polymeric ester compounds are liquids at 20° C. and atmospheric pressure, and have boiling points over 100° C., in many cases over 200° C. The compositions are useful to inhibit paraffin deposition during petroleum recovery, refining, storing, and transporting under field conditions, wherein the concentrates are pumpable and pourable, do not precipitate, and do not exhibit high pressure buildup inside enclosed containers at temperatures as low as −40° C. and as high as 60° C.

11 Claims, No Drawings

(56) References Cited

U.S. PATENT DOCUMENTS

2017/0152201 A1 6/2017 Becker et al.

OTHER PUBLICATIONS

George Wypych, "Plasticizers Use and Selection for Specific Polymers," Chapter 11, 107 pages, 2012.
Stephen O'Rourke, Hallstar Technical Publication, "High Performance Ester Plasticizers," (2001) 17 pages.
Wesley H. Whittington, Hallstar Technical Publication, "Ester Plassticizers for Polar Elastomers with Emphasis on Low-Temperature," 12 pages, (1983).
Hallstar Technical Publication, "The Function and Selection of Ester Plasticizers," 26 pages.
Vertellus Specialties Inc., Citroflex Product Brochure, 16 pages, (2013).
DOW P-Series Glycol Ethers, Product Information, (1992), 3 pages.
Lashkarbolooki et al, "Mitigation of Wax Deposition by Wax-Crystal Modifier for Kermanshash Crude Oil", Journal of Dispersion Science and Technology, vol. 32, No. 7, Jul. 2011, pp. 975-985.
European Search Report for EP Application No. 17736294.4, dated May 28, 2019, 7 pages.
European Search Report for EP Application No. 17736295.1, dated May 28, 2019, 7 pages.

* cited by examiner

TEMPERATURE-STABLE PARAFFIN INHIBITOR COMPOSITIONS

This application claims benefit of 62/275,339 filed Jan. 6, 2016.

FIELD OF THE INVENTION

The present invention generally relates to temperature stable paraffin inhibitor compositions.

BACKGROUND

Crude oil products are globally obtained from subterranean reservoirs using techniques such as drilling and hydraulic fracturing. Transportation of crude oil products from the subterranean reservoir, required to process, i.e. refine, the crude oil, is accomplished by moving the crude oil through pipes and into storage/transportation means such as rail cars, tanks, and the like. During the moving and/or storage, the crude is often subjected to ambient temperatures between −40° C. and 60° C.

Crude oil products include linear and branched alkanes having the general formula $C_nH_{2n+2}$ wherein n is typically about 1-50, although minor amounts of longer hydrocarbon chains do occur. The higher molecular weight alkanes can be problematic in that their melting points tend to be greater than ambient temperatures in some cases. For example, nonadecane has a melting point of 33° C.; higher alkanes can have melting points in excess of 60° C. for example.

The high melting alkane fractions lead to formation of paraffinic residue that solidifies and deposits on the sides and bottoms of pipes, storage vessels, and transportation vessels (rail cars, ocean tankers, etc.). The solidified paraffinic residue, also known as "paraffin wax", not only reduces the effective volume of the structure it's contained within but also represents a loss of a valuable component from the body of the crude oil. Excessive paraffin wax buildup reduces the efficiency of transporting crude oil and leads to increased costs related to added downtime for cleaning of the pipes and/or vessels as well as disposal of residues removed from the vessel which increase environmental burden. While the pipelines and vessels can be cleaned to remove the paraffinic residue, the process generates hazardous waste, takes the vessel out of service during the cleaning period, and is expensive.

The formation of paraffin wax can be reduced by additives, called "paraffin inhibitors" (PI) which interfere with the crystallization process of wax and/or suspend wax crystals in the oil. The addition of PI to the crude oil is effective in dispersing the paraffinic residue, thereby reducing the formation of residues in the pipelines and vessels to the benefit of the oil and gas industry. The PI effectively reduce the formation of paraffinic residues during storage and transportation of the crude oil products, mitigating economic loss and decreasing environmental impact.

Typical paraffin inhibitor polymers include, e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers and polyethyleneimines.

Nonaqueous formulations including such paraffin inhibitors as concentrate (PIC) must also be transported to, and stored at the field locations where crude oil is recovered so that it can be applied as needed to pipes, vessels, and the like. Providing PIC in a fluid format—i.e. in solution or dispersion—is highly advantageous for applying PI in the field because pumping equipment suitable to meter the desired amount of PI into a pipe or vessel is readily available. However, severe dispensing and usage problems are associated with the use of nonaqueous paraffin inhibitor concentrates (PIC) in areas where the winter temperature goes well below 0° C. In some field locations, for example, a winter temperature of −10° C. or less, −20° C. or less, −30° C. or less, or even −40° C. or less is not unusual. In such temperatures, PIC tend to form a gel or a solid with decreasing temperature, leading to the aforementioned severe dispensing and usage problems.

Previous solutions to the problem of PIC solidification include the addition of low-boiling solvents, such as methanol, to the PIC compositions. However, use of such solvents pose a different problem: at higher temperatures they can have a substantial vapor pressure. While cold temperatures are of concern to crude oil field operations, temperatures of up to about 60° C. are also encountered—often at the same field locations, depending on the seasonal weather patterns. It would be advantageous to provide additives for PIC that reduce the formation of solids therein from −40° C. to 60° C., thereby allowing the pumping of the PIC in the field within this temperature range and without buildup of high vapor pressure at the upper end of the range.

SUMMARY OF THE INVENTION

A paraffin inhibitor concentrate composition is provided for reducing paraffin or wax deposition in a crude oil storage or transportation vessel upon dilution. The paraffin inhibitor concentrate (PIC) composition comprises, consists essentially of, or consists at least of one paraffin inhibitor (PI) and at least one non-polymeric ester compound. The ester compound includes at least one ester group and in some embodiments two or more ester groups, wherein the ester compound is non-polymeric. In embodiments, the PIC compositions are nonaqueous compositions. In embodiments, the compositions flow at a temperature between about 0° C. and −40° C.

In some embodiments, the ester compound is a liquid at 20° C. at atmospheric pressure and has a boiling point greater than 100° C., or greater than 200° C. at atmospheric pressure. In some embodiments, the nonpolymeric ester compound comprises a glycol ester, a glycol ether ester, an esterified hydroxycarboxylic acid, an esterified mono-, di-, or tri-carboxylic acid, an esterified aromatic dicarboxylic acid, or a mixture of two or more thereof. In some embodiments, the ester compound comprises a glycol ether alkanoate, a glycol alkanoate, a glycol dialkanoate, a glycerol alkanoate, a glycerol dialkanoate, a glycerol trialkanoate, a citrate alkanoate, a citrate dialkanoate, a citrate trialkanoate, an alkyl 2-alkanoylcitrate, a dialkyl 2-alkanoylcitrate, a trialkyl 2-alkanoylcitrate, a maleate diester, an adipate diester, a terephthalate diester, a benzoate ester, a sebacate diester, a trimellitate triester, or a mixture of two or more thereof. In some embodiments, the glycol ether alkanoate is a glycol ether acetate or a blend of two or more thereof. In some embodiments, the glycol dialkanoate is a glycol diacetate or a blend of two or more thereof. In some embodiments, the glycerol trialkanoate is triacetin. In some embodiments, the ester compound is selected from propylene glycol diacetate, triethyl 2-acetyl citrate, tributyl 2-acetyl citrate, dipropylene glycol methyl ether acetate, propylene glycol methyl ether acetate, ethylene glycol butyl ether acetate, diethylene glycol butyl ether acetate, triacetin, dipropylene glycol dibenzoate, diethyl succinate, or a combination of two or more thereof.

In some embodiments, the composition comprises about 1 wt % to 99 wt % of the ester compound or mixture thereof. In some embodiments, the composition comprises about 5 wt % to 75 wt % of the ester compound or mixture thereof. In some embodiments, the composition further comprises a refined petroleum solvent. In some embodiments, the composition further comprises a surfactant. In some embodiments, the composition comprises about 1 wt % to 5 wt % of the surfactant. In some embodiments, the surfactant comprises an alcohol alkoxylate, the alcohol comprising a linear, branched, aromatic, or alkaromatic hydrocarbyl group having about 8 to 30 carbons and the alkoxylate comprising about 3 to 70 alkoxylate repeat units. In some embodiments, the alkoxylate is selected from ethoxylate, propoxylate, or a combination thereof.

In some embodiments, the composition comprises about 1 wt % to 20 wt % of a paraffin inhibiting polymer. In some embodiments, the paraffin inhibiting polymer comprises a copolymer comprising the residues of one or more alpha olefin monomers and a maleic anhydride monomer, the one or more alpha olefin monomers having the formula (I):

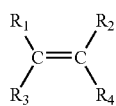

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

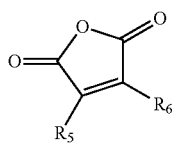

wherein $R_5$ and $R_6$ are independently selected from hydrogen or $C_1$-$C_{30}$ alkyl. In some embodiments, the maleic anhydride residue is further reacted with about 0.01 to 2.0 equivalents of a $C_{12}$-$C_{60}$ alkanol or amine per equivalent of anhydride. In some embodiments, the paraffin inhibiting polymer comprises an ethylene-vinyl acetate copolymer. In some embodiments, the paraffin inhibiting polymer comprises an alkylphenol-formaldehyde copolymer. In some embodiments, the paraffin inhibiting polymer comprises an acrylate and/or methacrylate (co)polymer.

A composition is provided comprising, consisting essentially of, or consisting of a crude oil source and a nonaqueous liquid composition comprising a paraffin inhibiting polymer and a nonpolymeric ester compound, wherein the paraffin inhibiting polymer is present in the crude oil source at about 50 ppm to 10,000 ppm (parts by weight).

A method is provided comprising, consisting essentially of, or consisting of forming a nonaqueous liquid composition comprising a paraffin inhibiting polymer and a non-polymeric ester compound; storing the composition in an enclosed container at a first temperature between about −40° C. and 60° C.; removing the composition from the container at a second temperature between about −40° C. and 60° C.; and applying the composition to a crude oil source, wherein the removing and the applying are accomplished using a mechanical pump. In some such embodiments, the first temperature, the second temperature, or both are between about −40° C. and −20° C.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "ester compound" means a non-polymeric compound having at least one ester moiety, for example in some embodiments one ester moiety, in other embodiments two ester moieties, in still other embodiments three ester moieties, and in still other embodiments more than three ester moieties.

As used herein, the term "non-polymeric" refers to a compound characterized as having 0 to about 4 covalently bonded repeating units and a molecular weight of less than 1000.

As used herein, the term "PIC additive" means an ester compound or a mixture of two or more ester compounds.

As used herein, the term "nonaqueous" means substantially excluding water.

As used herein, the term "liquid", "flows", or "flow" referring to a composition of the invention means that 10 mL of the composition vertically at rest on a substantially horizontal surface in a cylindrical container having dimensions of radius 1 inch and height 2 inches flows observably within about 10 seconds when tipped to a substantially horizontal position. In some embodiments, "liquid", "flows", or "flow" referring to a composition of the invention means a composition that has a Brookfield viscosity at 10 s$^{-1}$ of about 5 cP to 1000 cP.

As used herein, the term "crude oil" or "crude oil source" or "crude oil product" means the hydrocarbon product of a subterranean reservoir, wherein the product is a liquid or a solid at 20° C. under a pressure of 1 atm, the product including at least linear and branched alkanes having the general formula $C_nH_{2n+2}$ wherein n is typically about 1-50, and can be greater than 50.

As used herein, the terms "comprise(s)," "include(s)," "having," "has," "can," "contain(s)," and variants thereof, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Paraffin Inhibitor Concentrate (PIC) Additive Compounds

It has been discovered that non-polymeric ester compounds are useful as additives to nonaqueous PIC compositions to reduce or eliminate the solidification of the PI (paraffin inhibitor) at low temperatures. Ester compounds having melting points of less than about 20° C., boiling points greater than 100° C., and low vapor pressure at 60° C. are especially useful as additives to PIC compositions to reduce or eliminate the solidification of the PI temperatures between about 0° C. to −40° C. (−40° F.), for example about −10° C. to −40° C., or about −20° C. to −40° C., or −30° C. to −40° C., or even below −40° C. while providing compositional stability to temperatures up to 60° C. (158° F.).

The PIC additives include one or more such non-polymeric ester compounds. Exemplary classes of ester compounds include aromatic esters, alkanoate esters, esterified glycol ethers, esterified glycols, and esterified glycerols.

Exemplary ester compounds include esters of benzoic acid with aromatic, linear, or branched alkanols including but not limited to methanol, ethanol, n-propanol, iso-propanol, phenol, 2-ethylhexanol, diisononanol, n-butanol, iso-butanol, t-butanol, n-hexanol, isodecanol, n-octanol, iso-octanol, and blends of two or more such esters. In some embodiments, mixtures of two or more such aromatic ester(s) as well as mixtures of one or more such aromatic ester(s) with one or more of the other ester compounds listed elsewhere herein are employed as the PIC additive.

Exemplary ester compounds further include dialkyl diesters of benzene dicarboxylic acids such as terephthalate (benzene-1,4-dicarboxylate) or isophthalate (benzene-1,3-dicarboxylate) diesters of aromatic, linear, or branched alkanols including but not limited to the alkanols listed above, and mixtures of two such alkanols functionalizing a single phthalate ester compound. In some embodiments, mixtures of two or more such aromatic ester(s) as well as mixtures of one or more such aromatic ester(s) with one or more of the other ester compounds listed elsewhere herein are employed as the PIC additive.

Exemplary ester compounds further include trimellitate triesters and isomers thereof including triesters of alkanols including but not limited to the alkanols listed above, and mixtures of two or three such alkanols functionalizing a single trimellitate ester compound. In some embodiments, mixtures of two or more such aromatic ester(s) as well as mixtures of one or more such aromatic ester(s) with one or more of the other ester compounds listed elsewhere herein are employed as the PIC additive.

Exemplary ester compounds further include esters of hydroxycarboxylic acids including but not limited to esters of the alkanols listed above, and hydroxycarboxylic acids esterified with mixtures of two or three such alkanols. Suitable esters of hydroxycarboxylic acids include 2,2,4-trimethyl-1,3-pentanediol monoisobutyrate. In some embodiments, there are mixtures of two or more such ester(s) as well as mixtures of one or more such ester(s) with one or more of the other ester compounds listed elsewhere herein are employed as the PIC additive.

Exemplary ester compounds further include adipate, sebacate, succinate, and maleate diesters, citrate triesters, and isomers of any thereof wherein the alkanoate esters are diesters or triesters of alkanols including but not limited to the alkanols listed above, and mixtures of two such alkanols functionalizing a single alkanoate diester compound or even three such alkanols functionalizing a single citrate ester compound. In some embodiments, mixtures of two or more such alkanoate diester(s) or triester(s) as well as mixtures of one or more such alkanoate diester(s) and/or triester(s) with one or more of the other ester functional PIC additives listed elsewhere herein are employed as the PIC additive. In some embodiments where the alkanoate ester is a citrate, the citrate hydroxyl moiety not associated with a carboxylate is also functionalized, for example with an acetate or an alkyl ether moiety employing an alkanol or alkanoate as described above.

Exemplary ester compounds further include esterified glycol ethers, or glycol ether alkanoates having ester (alkanoate) groups corresponding to C2-C10 carboxylic acids, or C2-C8, or C2-C6, or C2-C4 carboxylic acids (where C2 carboxylic acid is acetic acid). Suitable esterified glycol ethers include ethylene glycol methyl ether acetate, ethylene glycol methyl ether butyrate, ethylene glycol methyl ether 2-ethylhexanoate, ethylene glycol ethyl ether acetate, ethylene glycol propyl ether acetate, ethylene glycol butyl ether acetate, ethylene glycol pentyl ether acetate, ethylene glycol hexyl ether acetate, diethylene glycol methyl ether acetate, diethylene glycol ethyl ether acetate, diethylene glycol propyl ether acetate, diethylene glycol butyl ether acetate, diethylene glycol pentyl ether acetate, diethylene glycol hexyl ether acetate, triethylene glycol methyl ether acetate, triethylene glycol ethyl ether acetate, triethylene glycol propyl ether acetate, triethylene glycol butyl ether acetate, triethylene glycol pentyl ether acetate, triethylene glycol hexyl ether acetate, propylene glycol methyl ether acetate, propylene glycol ethyl ether acetate, propylene glycol propyl ether acetate, propylene glycol butyl ether acetate, propylene glycol pentyl ether acetate, propylene glycol hexyl ether acetate, dipropylene glycol methyl ether acetate, dipropylene glycol ethyl ether acetate, dipropylene glycol propyl ether acetate, dipropylene glycol butyl ether acetate, dipropylene glycol pentyl ether acetate, dipropylene glycol hexyl ether acetate, tripropylene glycol methyl ether acetate, tripropylene glycol ethyl ether acetate, tripropylene glycol propyl ether acetate, tripropylene glycol butyl ether acetate, tripropylene glycol pentyl ether acetate, tripropylene glycol hexyl ether acetate, ethylene glycol phenyl ether acetate, diethylene glycol phenyl ether acetate, triethylene glycol phenyl ether acetate, propylene glycol phenyl ether acetate, dipropylene glycol phenyl ether acetate, and tripropylene glycol phenyl ether. In some embodiments, mixtures of two or more such esterified glycol ethers as well as mixtures of one or more such esterified glycol ethers with one or more of the other ester compounds listed elsewhere herein are employed as the PIC additive.

Exemplary ester compounds further include esterified glycols including alkanoate esters of dialkanols such as ethylene glycol, propylene glycol, and the like, wherein the ester (alkanoate) groups thereof correspond to C2-C10 carboxylic acids, or C2-C8, or C2-C6, or C2-C4 carboxylic acids. Suitable examples include propylene glycol diacetate (propylene diacetate), ethylene glycol diacetate (ethylene diacetate), ethylene glycol dipropanoate (ethylene propionate), diethylene glycol diacetate, butylene glycol diacetate (butylene diacetate), propylene glycol dibutyrate (propylene dibutyrate), and mixed esters such as ethylene acetate butyrate, propylene butyrate propanoate, and the like. In some embodiments, mixtures of two or more such esterified glycols as well as mixtures of one or more such esterified glycols with one or more of the other ester compounds listed elsewhere herein are employed as the PIC additive.

Exemplary ester compounds further include esterified glycerols including alkanoate esters of glycerol wherein the alkanoate groups correspond to C2-C10 carboxylic acids, or C2-C8, or C2-C6, or C2-C4 carboxylic acids, wherein the alkanoate esters include mono-, di-, and triglycerides (mono-, di-, or triesters). Suitable alkanoate esters of glycerol include olive oil, triacetin, glycerol monobutanoate, and glycerol dibutanoate. In some embodiments, mixtures of two or more such esterified glycerols as well as mixtures of one or more such esterified glycerols with one or more of the other ester compounds listed elsewhere herein are employed as the PIC additive.

In some embodiments the PIC additive comprises, consists essentially of, or consists of a glycol ether alkanoate, a glycol dialkanoate, a citrate trialkanoate, a maleate diester, an adipate diester, a terephthalate diester, a benzoate ester, a sebacate diester, a trimellitate triester, or a mixture of two or more thereof. In some embodiments one or more of the alkanoate groups is the residue of a C2-C10 carboxylic acid. In some embodiments one or more of the alkanoate groups is acetate, that is, the residue of acetic acid (C2 carboxylic acid). In some embodiments the glycol alkanoate is a glycol acetate or a glycol diacetate, or a blend of two or more thereof. In some embodiments one or more of the ester groups comprises the residue of a C2-C10 alkanol.

In some embodiments, the ester compounds are characterized as having log P (that is, partition coefficient when octanol and water are tested) of about −3 to 1, for example about −2 to 0. Log P is the logarithm of the ratio of the concentrations of an un-ionized solute in two solvents; when one of the solvents is water and the other is a non-polar solvent, then the log P value is also known as a measure of lipophilicity. When the non-polar solvent is octanol, Log P is the partition coefficient.

Solubility of the ester compounds in aqueous or oil-based systems can be predicted several ways, including HLB (hydrophilic-lipophilic balance) and OHLB (organic hydrophilic-lipophilic balance) values. HLB is most useful for predicting a solvent's solubility in water, and OHLB is most useful for predicting oil/water partitioning of solvents. The two scales run counter each other with respect to hydrophilicity. In some embodiments, the ester compounds have HLB of about 5 to 10, such as about 5 to 9, or about 6 to 10, or about 7 to 10, or about 7 to 9. In some embodiments, the ester compounds have an OHLB of about 10 to 21, such as about 11 to 21, or about 10 to 20, or about 10 to 19, or about 10 to 18, or about 10 to 17, or about 10 to 16, or about 11 to 16.

The HLB scale was derived initially for surfactants and provides a means of comparing the relative hydrophilicity of amphiphilic molecules. HLB values are also relevant for solvents with pseudo-surfactant qualities, such as glycol ethers. Complete water solubility occurs at HLB of about 7.3. Solvents with HLB values above this mark are completely miscible with water, while those below this value are only partially soluble in water. In some embodiments, the ester compounds or the PIC additives of the invention are soluble in water to at least 0.1 wt % at 20° C. and up to completely miscible in water at 20° C. (that is, any ratio of an ester compound or PIC additive and water form a solution). In some embodiments the ester compounds or PIC additives are soluble in water at between about 1 wt % and 30 wt % at 20° C., for example about 5 wt % to 25 wt %, or about 5 wt % to 20 wt %, or about 10 wt % to 30 wt %, or about 15 wt % to 30 wt %, or about 20 wt % to 30 wt % soluble in water at 20° C.

The ester compounds useful in the PIC of the invention are characterized as liquids at 20° C., and as having boiling points in excess of 100° C. at atmospheric pressure. The melting points of the ester compounds are generally 20° C. or less at atmospheric pressure, for example about 20° C. to −50° C., or about 5° C. to −50° C., or about 10° C. to −30° C. at atmospheric pressure. The boiling points of the ester compounds are greater than 100° C. at atmospheric pressure, for example about 100° C. to 300° C. at atmospheric pressure, or about 100° C. to 280° C., or about 100° C. to 250° C., or about 120° C. to 300° C., or about 150° C. to 300° C. at atmospheric pressure. The ester compounds are further characterized as having low vapor pressure at temperatures of about 60° C. or less.

In some embodiments, useful PIC additives comprise, consist essentially of, or consist of propylene glycol methyl ether acetate, propylene glycol diacetate, triethyl 2-acetyl citrate, tributyl 2-acetyl citrate, dipropylene glycol methyl ether acetate, propylene glycol methyl ether acetate, ethylene glycol butyl ether acetate, diethylene glycol butyl ether acetate, triacetin (triacetyl glycerol), dipropylene glycol dibenzoate, or diethyl succinate, or a combination of two or more thereof.

The foregoing listed ester compounds have the following properties, wherein all properties are measured at ambient pressure unless otherwise specified. All are liquids at 20° C.

propylene glycol diacetate: bp=191° C.

propylene glycol methyl ether acetate, bp=146° C.; vapor pressure=0.37 kPa at 20° C.

triethyl 2-acetyl citrate: bp=228-229° C.

tributyl 2-acetyl citrate: bp=172° C.-174° C. at 0.1 kPa; mp=−80° C.; vapor pressure=1.79 kPa at 20° C.; vapor pressure=5.5 kPa at 55° C.

dipropylene glycol methyl ether acetate: bp=208.9° C.; mp=−25.2° C.; vapor pressure=0.90 kPa at 25° C.

propylene glycol methyl ether acetate: bp=145° C.=146° C.; vapor pressure=0.49 kPa at 25° C.

ethylene glycol butyl ether acetate: bp=186° C.; vapor pressure=0.04 kPa at 20° C.;

vapor pressure=0.77 kPa at 55° C.

diethylene glycol butyl ether acetate: bp=245° C.

triacetin: bp=259° C.; mp=3° C.

dipropylene glycol dibenzoate: bp=232° C. at 0.67 kPa diethyl succinate: bp=217° C.; mp=−21° C.; vapor pressure=0.133 kPa at 55° C.

Paraffin Inhibitor Concentrates (PIC)

Disclosed herein are temperature stable paraffin inhibitor concentrate (PIC) compositions and methods for inhibiting solidification in paraffin inhibitor concentrates at temperatures encountered during storage and/or transportation thereof, e.g. about −40° C. to 60° C. The temperature stable paraffin inhibitor compositions flow, and thus are pourable or pumpable, at temperatures as low as −40° C., or about 0° C. to −40° C., or about −5° C. to −40° C., or about −10° C. to −40° C., or about −15° C. to −40° C., or about −20° C. to −40° C., or about −25° C. to −40° C., or about −30° C. to −40° C. and do not undergo observable phase separation at such temperatures. In some embodiments, the compositions further do not phase separate or solidify upon subsequent warming to 20° C., or as high as 60° C. In some embodiments the warmed compositions remain stable in a single phase. In some embodiments the compositions have a homogeneously dispersed or emulsified phase substantially over the temperature range of −40° C. to 60° C.

In some embodiments, the PIC compositions of the invention are nonaqueous. In other embodiments, the PIC compositions include up to about 10 wt % water, or up to about 9% water, or up to about 8% water, or up to about 7% water, or up to about 6% water, or up to about 5% water, or up to about 4% water, or up to about 3% water. In embodiments, the PIC compositions are characterized as having a substantially transparent, homogeneous appearance at least at one selected temperature between about 0° C. and 20° C., for example at 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C.

Conventional paraffin inhibitor concentrates (PIC) comprise, consist essentially of, or consist of a paraffin inhibitor (PI) and one or more petroleum-based solvents, optionally including a low-boiling cosolvent such as methanol, or a surfactant, or both. Typically, the PI is a polymer such as a branched or comb-like polymer. Suitable PI include, e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers and polyethyleneimines. In some embodiments, the PI comprises a copolymer comprising the residues of (i) an alpha olefin monomer and a maleic anhydride monomer or (ii) a maleic anhydride monomer and styrene. The alpha olefin monomer has the formula (I):

wherein $R_1$, $R_2$, $R_3$, and $R_4$ are independently selected from hydrogen and $C_5$-$C_{60}$ alkyl, with the proviso that at least two thereof are hydrogen; a blend of two or more such alpha olefin monomers having formula (I) are suitably included in the copolymer. In some embodiments $R_1$, $R_2$, $R_3$, and $R_4$ are independently hydrogen or $C_{12}$-$C_{60}$. The maleic anhydride monomer has the formula (II):

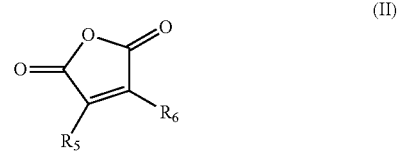

wherein $R_5$ and $R_6$ are independently hydrogen or $C_1$-$C_{60}$ alkyl. In some embodiments $R_5$ and $R_6$ are independently hydrogen or $C_{12}$-$C_{30}$.

In some embodiments, the copolymer of (I) and (II) is further reacted via the maleic anhydride residue with one or more alkanol or amine compounds to form the corresponding carboxylate or amide functionalities. In some such embodiments, the maleic anhydride residue is reacted with about 0.5 to 2.0 equivalents of the alkanol or amine per equivalent of anhydride. The alkanol or amine compounds are linear, branched, aromatic, or alkaromatic compounds having about 12 to 60 carbons.

In some embodiments, polymers that are paraffin inhibitors for crude oil also have additional utility as asphaltene dispersants, pour point depressants, flow improvers, and may provide other crude oil benefits known to one skilled in the art. Therefore, in some embodiments the PIC provides a benefit to crude oil as not only paraffin inhibitor but also as an asphaltene dispersant, pour point depressant, and flow improver and may also provide other crude oil benefits known to one skilled in the art.

Conventionally, the PI is present in the PIC typically at about 1 wt % to 5 wt %, or example about 2 wt % to 3 wt % and is diluted in the field to about 50 ppm to 10,000 ppm PI (paraffin inhibitor) by adding the PIC into a crude oil source, often along with one or more additional additives to accomplish e.g. biocidal activity, corrosion resistance, and the like. Petroleum-based solvents that conventionally provide the balance of PIC compositions comprise, consist essentially of, or consist of a refined petroleum solvent. Refined petroleum solvents comprise, consist essentially of, or consist of aromatic compounds such as benzene, toluene, xylene, light aromatic naphtha, heavy aromatic naphtha, kerosene, or diesel; and/or aliphatic compounds such as pentane, hexane, heptane, octane, nonane, decane, undecane, dodecane, tridecane, tetradecane, pentadecane, hexadecane, or any of their cyclic or branched isomers or a mixture thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is lower boiling material collected near the top portion of the distillation column; medium naphtha higher boiling material from near the middle. Heavy naphtha is an even higher boiling material from near the bottom portion of the column. PI solubility, particularly at temperatures below 20° C., limits the amount of polymer that can be delivered in such concentrates.

In some embodiments, the PIC compositions of the invention are nonaqueous compositions; that is, they are characterized by the substantial absence of water and are formed by substantially excluding water. The PIC compositions of the invention are liquids between about −40° C. and 60° C., or about −30° C. to 60° C., or about −20° C. to 60° C., or about −10° C. to 60° C., or about 0° C. to 60° C. By "liquid" it is meant that the PIC compositions of the invention flow.

In embodiments, the PIC compositions of the invention comprise up to 20 wt % PI, since the solubility of the PI in the PIC at temperatures below 20° C. is increased by the addition of the PIC additives of the invention. Thus, in embodiments, the PIC compositions of the invention comprise, consist essentially of, or consist of about 1 wt % to 20 wt % PI, or about 3 wt % to 20 wt %, or about 5 wt % to 20 wt %, or about 7 wt % to 20 wt %, or about 10 wt % to 20 wt % PI. In embodiments, the PIC of the invention comprise about 1 wt % to 99 wt % PIC additive including any of the ester functional compounds described above or a mixture of two or more thereof. For example, the PIC of the invention comprise about 3 wt % to 99 wt %, or about 5 wt % to 99 wt %, or about 10 wt % to 99 wt %, or about 15 wt % to 99 wt %, or about 20 wt % to 99 wt %, or about 25 wt % to 99 wt %, or about 30 wt % to 99 wt %, or about 35 wt % to 99 wt %, or about 40 wt % to 99 wt %, or about 45 wt % to 99 wt %, or about 50 wt % to 99 wt %, or about 55 wt % to 99 wt %, or about 60 wt % to 99 wt %, or about 65 wt % to 99 wt %, or about 70 wt % to 99 wt %, or about 75 wt % to 99 wt %, or about 80 wt % to 99 wt %, or about 85 wt % to 99 wt %, or about 1 wt % to 95 wt %, or about 1 wt % to 90 wt %, or about 1 wt % to 80 wt %, or about 1 wt % to 70 wt %, or about 1 wt % to 60 wt %, or about 1 wt % to 50 wt %, or about 5 wt % to 90 wt %, or about 5 wt % to 75 wt %, or about 10 wt % to 75 wt %, or about 25 wt % to 75 wt % of the PIC additive. In some embodiments, the balance of the PIC is a petroleum-based solvent such as benzene, toluene, xylene, or HAN. In some embodiments, the PIC is characterized by the substantial absence of a petroleum-based solvent. In some embodiments, the PIC includes one or more additional components such as surfactants, biocides, preservatives, stabilizers, and the like without limitation.

Optionally, the PIC of the invention, that is, a PIC including a PIC additive, further comprises a surfactant. In an embodiment, the surfactant is a nonionic or amphoteric surfactant. The PIC in such embodiments comprises about 0 wt % to 10 wt % of a nonionic or amphoteric surfactant, or about 0.5 wt % to 10 wt %, or about 1 wt % to 10 wt %, or about 2 wt % to 10 wt %, or about 3 wt % to 10 wt %, or about 4 wt % to 10 wt %, or about 5 wt % to 10 wt %, or about 0.5 wt % to 9 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 0.5 wt % to 2 wt %, or about 0.5 wt % to 1 wt %, or about 1 wt % to 8 wt %, or about 1 wt % to 5 wt % nonionic or amphoteric surfactant. Nonionic surfactants useful in the PIC include but are not limited to alkoxylated alcohols, such as copolymers of ethylene oxide and/or propylene oxide and/or butylene oxide and epoxylated, propoxylated, and epoxylated-propoxylated compounds comprising $C_6$-$C_{40}$ alkanols or $C_8$-$C_{30}$ alkanols. Suitable alkanols include linear, branched, aromatic, or alkaromatic alkanols. In some embodiments, the alkoxylated alcohols comprise about 3 to 100 alkoxylate repeat units, or about 3 to 90, or about 3 to 80, or about 3 to 70, or about 3 to 60, or about 3 to 50, or about 3 to 40, or about 3 to 30 alkoxylate repeat units. In some embodiments the alkoxylate repeat units are selected from ethoxylate, propoxylate, or a combination thereof in random or block configuration. In many embodiments, a blend of two or more alkoxylated alcohol surfactants are employed in the PIC. Other nonionic surfactants are similarly useful in the PIC of the invention and are not particularly limited. Some examples of suitable nonionic surfactants include alkylphenol alkoxylates, block copolymers of ethylene, propylene and butylene oxides, alkyl polyglucosides, polyalkoxylated glycerides, sorbitan esters and polyalkoxylated sorbitan esters, and alkoyl polyethylene glycol esters and diesters. Some examples of suitable amphoteric surfactants include alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, betaines, sultaines, alkyl amphoacetates and amphodiacetates, alkyl amphopropionates and amphodipropionates, and alkyliminodipropionate. Blends of nonionic and/or amphoteric surfactants, including blends of any of the above recited surfactants, are also usefully employed in the PIC of the invention.

We have unexpectedly found that PIC compositions of the invention flow at temperatures as low as −40° C. Stated differently, an aliquot of a PIC composition will observably flow at least at one temperature between 0° C. and −40° C. when a vessel containing the PIC composition is tipped on its side. This is an unexpected result, since concentrates of paraffin inhibiting polymers tend to become solidified, or precipitate from dispersions or solutions, at temperatures of about 0° C. and less, as is familiar to one skilled in the art of petroleum collecting, refining, transporting, storing during the winter months in certain geographic locations in the world. To address this problem, conventionally manufacturers use more low-boiling solvents, such as methanol, in an effort to maintain homogeneity of the concentrates at low temperatures so that the PIC can be poured or pumped in the field. Use of more solvent necessitates shipping more product, and adding a larger volume thereof to the targeted petroleum product, in order to obtain an effective concentration of PI polymer in the petroleum product and thereby avoid paraffin deposition.

Further, the use of low boiling solvents such a methanol can present safety issues due to flammability and low flash point of some such solvents. This is particularly true during the summer months in the field. Vapor pressure can build up in enclosed containers inside which temperatures may reach up to 60° C. Manufacturers may address this issue by formulating two different PICs, one for use at e.g. temperatures below 0° C., and one for use at temperatures above 0° C. However, this is impractical at best.

Applicant has discovered an approach to obviate all of the above problems. The PIC additives of the invention are not flammable and have boiling points above 100° C., which confers good solution/dispersion stability at temperatures up to 60° C. Since the PIC additives have boiling points of greater than 100° C., and in many embodiments greater than 200° C., the PIC additives provide minimal contribution to hazardous conditions caused by buildup of pressure within a storage container or other sealed vessel when exposed to temperatures up to 60° C. Yet, the PIC additives still prevent solidification at temperatures as low as −40° C. or even lower, for example −40° C. to −60° C. We have found that concentrates from 1 wt % to as much as 20 wt % solids are still flowable at temperatures of about 0° C. to −40° C., or even between −40° C. and −60° C. Advantageously, the PICs of the invention deliver high PI concentration and also stability at temperatures as high as 60° C.

The PIC additive may be present in the PIC compositions of the invention in an amount of about 1 wt % to about 99 wt % of the PIC, or about 1 wt % to about 95 wt %, or about 5 wt % to about 75%, or about 10 wt % to about 50 wt %, or about 1 wt % to 90 wt %, or about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 2 wt % to about 10 wt %, or about 2 wt % to about 5 wt %, or about 5 wt % to 90 wt %, or about 5 wt % to 75 wt %, or about 10 wt % to 75 wt %, or about 25 wt % to 75 wt %, or about 30 wt % to 70 wt %, or about 33 wt % to 67 wt %, or about 25 wt % to 40 wt %, or about 55 wt % to 70 wt %, or about 40 wt % to 60 wt %, or about 65 wt % to 90 wt %, or about 70 wt % to 90 wt % of the PIC composition.

In some embodiments, the PIC compositions of the invention are characterized as having Brookfield viscosity of about 5 cP to 1000 cP at −40° C., when measured at a shear rate of 10 s$^{-1}$ using a Brookfield viscometer equipped with a cup and bob, DIN spindle size 21 (viscometer equipment obtained from the Brookfield Engineering Laboratories of Middleboro, Mass.). For example, in some embodiments, the PIC compositions of the invention are characterized as having Brookfield viscosity at −40° C. and 10 s$^{-1}$ of about 5 cP to 900 cP, or about 5 cP to 800 cP, or about 5 cP to 700 cP, or about 5 cP to 600 cP, or about 5 cP to 500 cP, or about 5 cP to 400 cP, or about 5 cP to 300 cP, or about 5 cP to 200 cP, or about 5 cP to 100 cP, or about 10 cP to 1000 cP, or about 15 cP to 1000 cP, or about 20 cP to 1000 cP, or about 25 cP to 1000 cP, or about 30 cP to 1000 cP, or about 40 cP to 1000 cP, or about 50 cP to 1000 cP, or about 60 cP to 1000 cP, or about 70 cP to 1000 cP, or about 80 cP to 1000 cP, or about 90 cP to 1000 cP, or about 100 cP to 1000 cP, or about 10 cP to 500 cP, or about 20 cP to 500 cP, or about 10 cP to 250 cP, or about 20 cP to 250 cP, or about 10 cP to 200 cP, or about 20 cP to 200 cP, or about 10 cP to 100 cP, or about 20 cP to 100 cP.

Methods of Using the PIC Compositions

The PIC compositions are usefully added to a source of crude oil or another unrefined petroleum source at a concentration typically targeting about 100 ppm to 1000 ppm of the PI. Examples of unrefined petroleum sources may include transfer piping, storage tanks, and transport vessels. Unrefined petroleum is crude oil which has not yet been broken down into its component parts at an oil refinery. In this respect, the PIC behaves as intended and with the same beneficial effect as conventional PIC. However, in some embodiments, since the PIC additives usefully enable a higher PI concentration than is possible for conventional PIC, a lower rate of pumping, pouring, dripping, spraying etc. of the PIC is employed to achieve the target PI concentration in the petroleum source. That is, a lower dosing of the pipeline or other system to transport or store crude oil is required.

A principal benefit of the PIC additives is their ability to flow at temperatures as low as −40° C. to facilitate pouring or pumping of the PIC from a storage container or vessel into contact with a crude oil source requiring paraffin inhibition. Thus, in embodiments, a method of the invention includes forming a nonaqueous liquid composition comprising, consisting essentially of, or consisting of a PI and a PIC additive; storing the composition in an enclosed container at a first temperature between about −40° C. and 60° C.; removing the composition from the container at a second temperature between about −40° C. and 60° C.; and applying the composition to a crude oil (unrefined petroleum) source. In embodiments, the removing and the applying are accomplished using a mechanical pump. In embodiments, the first temperature, the second temperature, or both are between about −40° C. and 0° C., or about −40° C. to −10° C., or about −40° to −20° C., or about −40° C. to −30° C. It will be understood that storing and removing are carried out over a variable range of temperatures, and in particular storage temperatures often vary during the storage period. Thus, the first temperature of the method is suitably measured at any point during storage, wherein the temperature during at least some period of storage is within the stated range. In some embodiments the applying is sufficient to contact the crude petroleum source with about 100 ppm to 1000 ppm of the PI.

The method of applying the PIC to the crude oil source is not particularly limited. One of skill will appreciate that crude oil additives such as paraffin inhibitors are conventionally added by using available equipment including e.g. pipes, mixers, pumps, tanks, injection ports, and the like. Aside from the increased concentration of PI in the PIC of the invention, addition of the PIC to a petroleum source is usefully accomplished using conventional equipment and the same equipment with which an operator in the field is acquainted; that is, no special steps or other procedures are required to use the PIC of the invention. In some embodiments, the PIC is applied to one or more subterranean hydrocarbon recovery (oil well) locations, such as downhole or on the backside, using capillary string, gas lift, slip stream or other methods, at the wellhead, or at any other point downstream of the reservoir.

Experimental

General Procedure

Formulations of PIC with various ester compounds were blended. The following paraffin inhibitor polymers were employed in the blends. In each case, the indicated amount of polymer added is the amount of the polymer as supplied in a solution or dispersion (and not the actual weight of the dry polymer (actives)):

Polymer 1: A 70 wt % mixture in xylene of a copolymer of an α-olefin with about 13 wt % maleic anhydride, wherein the maleic anhydride functionality is esterified with C18+ alcohols at a ratio of about 0.9 moles alcohol to 1 mole maleic anhydride Polymer 2: An 82 wt % mixture in xylene of a copolymer of an α-olefin with about 8 wt % maleic anhydride, wherein the maleic anhydride functionality is esterified with C20+ alcohols at a ratio of about 2.03 moles alcohol to 1 mole maleic anhydride Polymer 3: A 70 wt % mixture in xylene of a copolymer of an α-olefin with about 14 wt % maleic anhydride, wherein the maleic anhydride functionality is esterified with C16+ alcohols at a ratio of about 0.9 moles alcohol to 1 mole maleic anhydride Polymer 4: a 69 wt % mixture in HAN of a copolymer of an α-olefin with about 8 wt % maleic anhydride, wherein the maleic anhydride functionality is esterified with a mixture of C20+ alcohols at a ratio of about 1.21 moles alcohol to 1 mole maleic anhydride.

Polymer 5: an alkylated phenol-formaldehyde resin, 50 wt % in xylene.

Polymer 6: an 80 wt % mixture in xylene of a copolymer of an α-olefin with about 10 wt % maleic anhydride, wherein the maleic anhydride functionality is esterified with C18+ alcohols at a ratio of about 0.9 moles alcohol to 1 mole maleic anhydride.

After mixing the components, a 10 mL aliquot of each compositions was added to a 20 mL bottle having radius 1 inch and height 2 inches. The bottles were capped and warmed to between about 25° C. and 65° C. for up to about 30 minutes, as needed to complete mixing of the components. After allowing the contents of the bottles to cool to ambient laboratory temperature, the contents were observed and initial observations recorded (Initial Observations in the tables below). Then the bottles were placed in a freezer set to a temperature of −40° C. for between 12 and 18 hours. The bottles were removed from the freezer and observed (At −40° C. or −45° C. observations in the tables below); the bottles were further tipped onto their side in order to observe flow of the contents.

The compositions tested herein are said to "flow" at the indicated temperature when 10 mL of the composition vertically at rest on a substantially horizontal surface the cylindrical container (radius 1 inch, height 2 inches) flows observably within about 10 seconds when tipped to a substantially horizontal position. This amount of flow is known to be sufficient to indicate that the composition is pourable or pumpable for use in the field, where such concentrates are applied to one or more crude oil transportation or storage systems.

Finally, the bottles were allowed to warm to ambient laboratory temperature and the contents observed (RT After −40° C. observations in the tables below). In some cases, observations of the Example compositions were made after 48 hours or 1 week after allowing to warm to ambient laboratory temperature.

In some cases, one or more cooling and heating cycles is additionally carried out on the example compositions. In such cases the bottles are placed in a −40° C. freezer for about 72 hours, followed by observation then the bottles are allowed to warm to ambient laboratory temperature for about 2 hours, followed by observation; then the bottles are placed in an oven set to 60° C. for about 18 hours, followed by observation; then the bottles are allowed to cool to ambient laboratory temperature for about 2 hours, followed by observation; then the bottles may be subjected one or more additional cooling and heating cycles wherein the cycles are alternated.

Examples 1-45

Employing HAN (heavy aromatic naphtha) or a blend of HAN and toluene as solvent, 1.45 g of the Polymer 1 dispersion, and 0.3 g of C11-C15 alcohol ethoxylate (as surfactant), the ester compounds shown in Table 1 were combined therewith and tested according to the General Procedure set forth above. Results are shown in Table 1.

TABLE 1

Compositions and observed results for Examples 1-45.

| | Component, g | | Observations | | |
|---|---|---|---|---|---|
| Example | HAN | none | Initial | At −40° C. | RT After −40° C. |
| 1 | 8.25 | n/a | Clear liquid | Clear solid/gel | Clear liquid |
| | Toluene | | | | |
| 2 | 6.19 | 2.06 | Clear liquid | Clear solid/gel | Clear liquid |
| 3 | 4.13 | 4.13 | Clear liquid | Clear solid/gel | Clear liquid |
| 4 | 2.06 | 6.19 | Clear liquid | Clear solid/gel | Clear liquid |
| 5 | 0 | 8.25 | Clear liquid | Clear solid/gel | Clear liquid |
| | Diethylene glycol butyl ether | | | | |
| 6 | 6.19 | 2.06 | Clear liquid | Clear solid/gel | Clear liquid |
| 7 | 4.13 | 4.13 | Clear liquid | Clear solid/gel | Clear liquid |
| 8 | 2.06 | 6.19 | Clear liquid | Liquid | Hazy liquid |
| 9 | 0 | 8.25 | Hazy liquid | Opaque solid | Cloudy liquid |
| | 2,2,4-Trimethyl-1,3-pentanediol isobutyrate | | | | |
| 10 | 6.19 | 2.06 | Clear liquid | Clear solid/gel | Clear liquid |
| 11 | 4.13 | 4.13 | Clear liquid | Clear solid/gel | Clear liquid |

TABLE 1-continued

Compositions and observed results for Examples 1-45.

| Component, g | | | Observations | | |
|---|---|---|---|---|---|
| 12 | 2.06 | 6.19 | Clear liquid | Opaque solid | Slightly hazy liquid |
| 13 | 0 | 8.25 | Clear liquid | Slush | Cloudy liquid |
| Propylene Glycol Diacetate | | | | | |
| 14 | 6.19 | 2.06 | Clear liquid | Clear solid/gel | Clear liquid |
| 15 | 4.13 | 4.13 | Clear liquid | Liquid | Hazy liquid |
| 16 | 2.06 | 6.19 | Hazy liquid | Solid layer over liquid | Solid layer over liquid |
| 17 | 0 | 8.25 | Hazy liquid | Solid layer over liquid | Solid layer over liquid |
| Triacetin | | | | | |
| 18 | 6.19 | 2.06 | Clear liquid | Clear solid/gel | Clear liquid |
| 19 | 4.13 | 4.13 | Hazy liquid | Solid layer over liquid | Separated hazy liquid |
| 20 | 2.06 | 6.19 | Hazy liquid | Solid layer over liquid | Solid layer over liquid |
| 21 | 0 | 8.25 | Hazy liquid | Solid layer over liquid | |
| Triethyl 2-Acetylcitrate | | | | | |
| 22 | 6.19 | 2.06 | Clear liquid | Clear solid/gel | Clear liquid |
| 23 | 4.13 | 4.13 | Clear liquid | Liquid | Hazy liquid |
| 24 | 2.06 | 6.19 | Hazy liquid | Separated solid | Solid layer over liquid |
| 25 | 0 | 8.25 | Hazy liquid | Separated solid | Solid layer over liquid |
| Dipropylene Glycol Methyl Ether Acetate | | | | | |
| 26 | 6.19 | 2.06 | Clear liquid | Clear solid/gel | Clear liquid |
| 27 | 4.13 | 4.13 | Clear liquid | Opaque solid | Clear liquid |
| 28 | 2.06 | 6.19 | Clear liquid | Liquid | Hazy liquid |
| 29 | 0 | 8.25 | Hazy liquid | Liquid | Cloudy liquid |
| Propylene Glycol Methyl Ether Acetate | | | | | |
| 30 | 6.19 | 2.06 | Clear liquid | Clear solid/gel | Clear liquid |
| 31 | 4.13 | 4.13 | Clear liquid | Opaque solid | Clear liquid |
| 32 | 2.06 | 6.19 | Clear liquid | Liquid | Hazy liquid |
| 33 | 0 | 8.25 | Cloudy liquid | Liquid | Cloudy liquid |
| Diethylene glycol butyl ether acetate | | | | | |
| 34 | 6.19 | 2.06 | Clear liquid | Clear solid/gel | Clear liquid |
| 35 | 4.13 | 4.13 | Clear liquid | Opaque solid | Clear liquid |
| 36 | 2.06 | 6.19 | Clear liquid | Liquid | Very hazy liquid |
| 37 | 0 | 8.25 | Slightly Hazy liquid | Liquid | Cloudy liquid |
| Ethylene glycol butyl ether | | | | | |
| 38 | 6.19 | 2.06 | Clear liquid | Clear solid/gel | Clear liquid |
| 39 | 4.13 | 4.13 | Clear liquid | Opaque solid | Clear liquid |
| 40 | 2.06 | 6.19 | Clear liquid | Slush | Hazy liquid |
| 41 | 0 | 8.25 | Clear liquid | Liquid | Cloudy liquid |
| Diisononyl Adipate | | | | | |
| 42 | 6.19 | 2.06 | Clear liquid | Clear solid/gel | Clear liquid |
| 43 | 4.13 | 4.13 | Clear liquid | Clear solid/gel | Clear liquid |
| 44 | 2.06 | 6.19 | Clear liquid | Clear solid/gel | Hazy liquid |
| 45 | 0 | 8.25 | Clear liquid | Clear solid/gel | Cloudy liquid |

The composition of Example 15 was found to have a Brookfield viscosity of about 45 cP at −40° C. and 10 s$^{-1}$.

Examples 46-86

The procedure of Examples 1-45 was repeated, except that toluene was used as solvent instead of HAN and observations at ambient temperature (RT) after storage at −40° C. were not recorded. Results are shown in Table 2.

TABLE 2

Compositions and observed results for Examples 46-86.

| | Component, g | | Observations | |
|---|---|---|---|---|
| Example | Toluene | Diethylene glycol butyl ether | Initial | At −40° C. |
| 46 | 8.25 | 0 | Clear liquid | Clear gel/solid |
| 47 | 6.19 | 2.06 | Clear liquid | Clear gel/solid |
| 48 | 4.13 | 4.13 | Clear liquid | Clear liquid |
| 49 | 2.06 | 6.19 | Clear liquid | Clear gel/solid |
| 50 | 0 | 8.25 | Hazy liquid | Opaque solid |
| | | 2,2,4-Trimethyl-1,3-pentanediol monoisobutyrate | | |
| 51 | 6.19 | 2.06 | Clear liquid | Clear gel/solid |
| 52 | 4.13 | 4.13 | Clear liquid | Clear gel/solid |
| 53 | 2.06 | 6.19 | Clear liquid | Opaque solid |
| 54 | 0 | 8.25 | Clear liquid | Opaque slush |
| | | Propylene Glycol Diacetate | | |
| 55 | 6.19 | 2.06 | Clear liquid | Clear gel/solid |
| 56 | 4.13 | 4.13 | Clear liquid | Clear liquid |
| 57 | 2.06 | 6.19 | Hazy liquid | Opaque solid over clear liquid |
| 58 | 0 | 8.25 | Hazy separated solid/gel | Opaque liquid with solid disk |
| | | Triacetin | | |
| 59 | 6.19 | 2.06 | Clear liquid | Clear liquid |
| 60 | 4.13 | 4.13 | Hazy liquid | Opaque solid over clear liquid |
| 61 | 2.06 | 6.19 | Hazy liquid | Opaque solid over clear liquid |
| 62 | 0 | 8.25 | Hazy separated solid/gel | Opaque solid over clear liquid |
| | | Triethyl 2-Acetylcitrate | | |
| 63 | 6.19 | 2.06 | Clear liquid | Clear slush |
| 64 | 4.13 | 4.13 | Hazy liquid | Opaque solid over clear liquid |
| 65 | 2.06 | 6.19 | Hazy liquid | Opaque solid over clear liquid |
| 66 | 0 | 8.25 | Hazy liquid with opaque gel chunks | Clear slow flowing gel with opaque solid chunks |
| | | Dipropylene Glycol Methyl Ether Acetate | | |
| 67 | 6.19 | 2.06 | Clear liquid | Clear gel/solid |
| 68 | 4.13 | 4.13 | Clear liquid | Opaque slush |
| 69 | 2.06 | 6.19 | Clear liquid | Opaque liquid |
| 70 | 0 | 8.25 | Hazy liquid | Clear liquid with opaque solids lining vial walls |
| | | Propylene Glycol Methyl Ether Acetate | | |
| 71 | 6.19 | 2.06 | Clear liquid | Clear gel/solid |
| 72 | 4.13 | 4.13 | Clear liquid | Opaque liquid |

TABLE 2-continued

Compositions and observed results for Examples 46-86.

| | Component, g | | Observations | |
|---|---|---|---|---|
| 73 | 2.06 | 6.19 | Clear liquid | Opaque liquid |
| 74 | 0 | 8.25 | Cloudy liquid | Clear liquid with opaque solids lining vial walls |
| | Diethylene glycol butyl ether Acetate | | | |
| 75 | 6.19 | 2.06 | Clear liquid | Clear gel/solid |
| 76 | 4.13 | 4.13 | Clear liquid | Opaque liquid |
| 77 | 2.06 | 6.19 | Clear liquid | Opaque liquid |
| 78 | 0 | 8.25 | Hazy liquid | Opaque liquid |
| | Ethylene glycol butyl ether acetate | | | |
| 79 | 6.19 | 2.06 | Clear liquid | Clear gel/solid |
| 80 | 4.13 | 4.13 | Clear liquid | Opaque slush |
| 81 | 2.06 | 6.19 | Clear liquid | Opaque liquid |
| 82 | 0 | 8.25 | Clear liquid | Opaque liquid |
| | Diisononyl Adipate | | | |
| 83 | 6.19 | 2.06 | Clear liquid | Clear gel/solid |
| 84 | 4.13 | 4.13 | Clear liquid | Clear gel/solid |
| 85 | 2.06 | 6.19 | Clear liquid | Opaque solid |
| 86 | 0 | 8.25 | Clear liquid | Opaque solid |

Examples 87-106

The procedure of Examples 1-45 was repeated, except using 0.3 g of a C12-C15 alcohol ethoxylate in place of the 0.3 g of C11-C15 alcohol ethoxylate as surfactant. Results are shown in Table 3.

TABLE 3

Compositions and observed results for Examples 87-106.

| Example | Component, g | | Observations | | |
|---|---|---|---|---|---|
| | HAN | Tributyl 2-Acetylcitrate | Initial | At −40° C. | RT After −40° C. |
| 87 | 8.25 | 0 | Barely hazy liquid | Clear gel/solid | Clear liquid |
| 88 | 6.19 | 2.06 | Barely hazy liquid | Clear gel/solid | Clear liquid |
| 89 | 4.13 | 4.13 | Clear liquid | Clear liquid | Barely hazy liquid |
| 90 | 2.06 | 6.19 | Clear liquid | Clear liquid | Opaque liquid |
| 91 | 0 | 8.25 | Cloudy liquid | Fast melting opaque solid | Opaque milky liquid |
| | Ethyl L-Lactate | | | | |
| 91 | 6.19 | 2.06 | Clear liquid | Clear gel/solid | Clear liquid |
| 92 | 4.13 | 4.13 | Clear liquid | Clear gel/solid | Clear liquid |
| 93 | 2.06 | 6.19 | Cloudy liquid | Opaque solid over clear liquid | Opaque fluffy stuff over clear liquid |
| 94 | 0 | 8.25 | Cloudy liquid with solid ring | Cloudy liquid with opaque ring | Opaque fluffy stuff over clear liquid with solid ring |
| | Dipropylene Glycol Dibenzoate | | | | |
| 95 | 6.19 | 2.06 | Barely hazy liquid | Clear gel/solid | Slightly hazy liquid |
| 96 | 4.13 | 4.13 | Barely hazy liquid | Clear liquid | Slightly hazy liquid |

TABLE 3-continued

Compositions and observed results for Examples 87-106.

| Example | Component, g | | Observations | | |
|---|---|---|---|---|---|
| 97 | 2.06 | 6.19 | Cloudy liquid | Clear slush | Cloudy liquid |
| 98 | 0 | 8.25 | Cloudy flowing gel | Clear gel/solid | Cloudy liquid |
| | Dibutyl Adipate | | | | |
| 99 | 6.19 | 2.06 | Clear liquid | Clear gel/solid | Clear liquid |
| 100 | 4.13 | 4.13 | Clear liquid | Clear gel/solid | Clear liquid |
| 101 | 2.06 | 6.19 | Clear liquid | Opaque slush | Cloudy liquid |
| 102 | 0 | 8.25 | Clear liquid | Opaque liquid | Opaque milky liquid |
| | Diethyl Succinate | | | | |
| 103 | 6.19 | 2.06 | Clear liquid | Clear gel/solid | Clear liquid |
| 104 | 4.13 | 4.13 | Clear liquid | Clear liquid | Slightly hazy liquid |
| 105 | 2.06 | 6.19 | Cloudy liquid | Cloudy liquid with opaque ring | Opaque liquid |
| 106 | 0 | 8.25 | Cloudy liquid with solid ring | Separated opaque solid | Chunky opaque liquid |

Examples 107-115

Using the General Procedure, Polymer 2 and a C11-C15 alcohol ethoxylate as surfactant were employed in combination with various blends of ester compounds as the PIC additive, further wherein HAN, toluene, or a blend thereof was employed as solvent. Compositions that were pourable at −40° C. are shown in Table 4 along with observed appearance initially and at −40° C.

TABLE 4

Observations for various PIC additives and solvents/solvent ratios employed in PIC compositions of Examples 107-115.

| Ex. | Component, g | | | | | Observations | | |
|---|---|---|---|---|---|---|---|---|
| | Benzyl Benzoate | Diethylene glycol butyl acetate | Toluene | C11C15 Alcohol Ethoxylate | Polymer 2 | Initial | At −40° C. | RT After −40° C. |
| 107 | 0.88 | 3.59 | 4.29 | 0 | 1.24 | Clear liquid | Flowing gel | n/a |
| | HAN | Acetyl Triethyl Citrate | Toluene | | | | | |
| 108 | 52.30 | 32.30 | 0 | 3 | 12.4 | Clear liquid | Clear liquid | Cloudy liquid |
| | HAN | Triacetin | Toluene | | | | | |
| 109 | 39.23 | 24.23 | 21.15 | 3 | 12.4 | Clear liquid | Clear liquid | Cloudy liquid |
| | HAN | Propylene Glycol Diacetate | Diethylene Glycol Butyl Ether | | | | | |
| 110 | 39.23 | 24.23 | 21.15 | 3 | 12.4 | Clear liquid | Clear liquid | Opaque liquid |
| | HAN | Acetyl Triethyl Citrate | Toluene | | | | | |
| 111 | 32.48 | 30.98 | 21.15 | 3 | 12.4 | Clear liquid | Clear liquid | Cloudy liquid |

TABLE 4-continued

Observations for various PIC additives and solvents/solvent ratios employed in PIC compositions of Examples 107-115.

| Ex. | Benzyl Benzoate | Diethylene glycol butyl acetate | Toluene | C11C15 Alcohol Ethoxylate | Polymer 2 | Initial | At −40° C. | RT After −40° C. |
|---|---|---|---|---|---|---|---|---|
| | HAN | Triacetin | Toluene | | | | | |
| 112 | 32.48 | 30.98 | 21.15 | 3 | 12.4 | Clear liquid | Clear liquid | Cloudy liquid |
| | HAN | Propylene Glycol Diacetate | Toluene | | | | | |
| 113 | 43.30 | 41.30 | 0 | 3 | 12.4 | Cloudy liquid | Cloudy liquid | Opaque liquid |
| 114 | 32.48 | 30.98 | 21.15 | 3 | 12.4 | Cloudy liquid | Cloudy liquid | Opaque liquid |
| | HAN | Propylene Glycol Diacetate | Toluene | | | | | |
| 115 | 32.48 | 30.98 | 21.15 | 3 | 12.4 | Clear liquid | Clear liquid | Cloudy liquid |

Examples 116-145

Using the General Procedure, solvent blends and ratios of solvents in such blends was varied for 12.4 g Polymer 2 and 3.0 g of Tergitol 15-S-3 (secondary alcohol ethoxylate, available from the DOW® Chemical Company of Midland, Mich.) in the presence of various ester compounds. "Solvent 150" is SOLVESSO® 150 (obtained from the ExxonMobil Chemical Co. of Irving, Tex.); "Solvent 195" is SOLVESSO® 195 (obtained from ExxonMobil). Observations were made initially and after 12-18 hours storage at −40° C. Results are shown in Table 5.

TABLE 5

Compositions and observations for Examples 116-145.

| Example | HAN | Acetyl Triethyl Citrate | Toluene | Initial | At −40° C. |
|---|---|---|---|---|---|
| 116 | 52.30 | 32.30 | 0.00 | Clear liquid | Clear liquid |
| 117 | 32.48 | 30.98 | 21.15 | Clear liquid | Clear liquid |
| | HAN | Triacetin | Toluene | | |
| 118 | 39.23 | 24.23 | 21.15 | Clear liquid | Clear liquid |
| 119 | 32.48 | 30.98 | 21.15 | Hazy liquid | Clear liquid with solid disk |
| | HAN | Propylene Glycol Diacetate | Toluene | | |
| 120 | 32.48 | 30.98 | 21.15 | Clear liquid | Clear fast melting slush |

TABLE 5-continued

Compositions and observations for Examples 116-145.

| | HAN | Acetyl Triethyl Citrate | Solvent 150 | Initial | Observations |
|---|---|---|---|---|---|
| 121 | 52.30 | 32.30 | 0 | Clear liquid | Clear liquid |
| 122 | 32.48 | 30.98 | 21.15 | Clear liquid | Clear fast melting slush |
| | HAN | Triacetin | Solvent 150 | | |
| 123 | 39.23 | 24.23 | 21.15 | Clear liquid | Clear liquid |
| 124 | 32.48 | 30.98 | 21.15 | Hazy liquid | Clear liquid with solid disk |
| | HAN | Propylene Glycol Diacetate | Solvent 150 | | |
| 125 | 32.48 | 30.98 | 21.15 | Clear liquid | Clear fast melting slush |
| | HAN | Acetyl Triethyl Citrate | Solvent 195 | | |
| 126 | 52.30 | 32.30 | 0.00 | Clear liquid | Clear slush |
| 127 | 32.48 | 30.98 | 21.15 | Clear liquid | Clear slush |
| | HAN | Triacetin | Solvent 195 | | |
| 128 | 39.23 | 24.23 | 21.15 | Clear liquid | Clear liquid with solid ring |

TABLE 5-continued

Compositions and observations for Examples 116-145.

| | Component, g | | | Observations | |
|---|---|---|---|---|---|
| 129 | 32.48 | 30.98 | 21.15 | Hazy liquid | Separated cloudy solid |

| | HAN | Propylene Glycol Diacetate | Solvent 195 | | |
|---|---|---|---|---|---|
| 130 | 32.48 | 30.98 | 21.15 | Clear liquid | Clear slush |

| | HAN | Acetyl Triethyl Citrate | Toluene | | |
|---|---|---|---|---|---|
| 131 | 0 | 32.30 | 52.30 | Clear liquid | Clear slush |
| 132 | 0 | 30.98 | 53.63 | Clear liquid | Clear slush |

| | HAN | Triacetin | Toluene | | |
|---|---|---|---|---|---|
| 133 | 0 | 24.23 | 60.38 | Clear liquid | Clear liquid |
| 134 | 0 | 30.98 | 53.63 | Hazy liquid | Separated cloudy solid |

| | HAN | Propylene Glycol Diacetate | Toluene | | |
|---|---|---|---|---|---|
| 135 | 0 | 30.98 | 53.63 | Clear liquid | Clear liquid |

| | HAN | Acetyl Triethyl Citrate | Toluene | | |
|---|---|---|---|---|---|
| 136 | 52.30 | 32.30 | 0.00 | Clear liquid | Clear liquid |
| 137 | 32.48 | 30.98 | 21.15 | Clear liquid | Clear liquid |

| | HAN | Triacetin | Toluene | | |
|---|---|---|---|---|---|
| 138 | 39.23 | 24.23 | 21.15 | Clear liquid | Clear liquid |
| 139 | 32.48 | 30.98 | 21.15 | Hazy liquid | Opaque solid over cloudy liquid |

| | HAN | Propylene Glycol Diacetate | Toluene | | |
|---|---|---|---|---|---|
| 140 | 32.48 | 30.98 | 21.15 | Clear liquid | Clear slush |

| | Solvent 195 | Acetyl Triethyl Citrate | Toluene | | |
|---|---|---|---|---|---|
| 141 | 52.30 | 32.30 | 0.00 | Clear liquid | Clear liquid |
| 142 | 32.48 | 30.98 | 21.15 | Clear liquid | Clear slush |

| | Solvent 195 | Triacetin | Toluene | | |
|---|---|---|---|---|---|
| 143 | 39.23 | 24.23 | 21.15 | Clear liquid | Clear liquid |
| 144 | 32.48 | 30.98 | 21.15 | Hazy liquid | Opaque solid over cloudy liquid |

| | Solvent 195 | Propylene Glycol Diacetate | Toluene | | |
|---|---|---|---|---|---|
| 145 | 32.48 | 30.98 | 21.15 | Clear liquid | Opaque slush |

Example 146-152

Using the General Procedure, 12.4 g of Polymer 2 was tested with and without Tergitol 15-S-3 (obtained from the DOW® Chemical Company of Midland, Mich.), a mixture of C11-C15 secondary alcohol ethoxylates with an average of 3 ethylene oxide units; and with and without toluene in the presence of various ester compounds. Compositions and results are shown in Table 6.

TABLE 6

Compositions and observed results for Examples 146-152.

| | Components, g | | | | Observations | | |
|---|---|---|---|---|---|---|---|
| Example | HAN | Acetyl Triethyl Citrate | Toluene | Tergitol 15-S-3 | Initial | At −40° C. | RT After −40° C. |
| 146 | 53.80 | 33.80 | 0 | 0 | Clear liquid | Clear liquid | Cloudy liquid |
| 147 | 33.48 | 31.98 | 22.15 | 0 | Clear liquid | Clear liquid | Cloudy liquid |
| | | Triacetin | | | | | |
| 148 | 37.23 | 25.23 | 22.15 | 0 | Clear liquid | Clear liquid | Cloudy liquid |
| 149 | 33.48 | 31.98 | 22.15 | 0 | Slightly hazy liquid | Clear solid over clear liquid | Chunky cloudy liquid |

TABLE 6-continued

Compositions and observed results for Examples 146-152.

| | Components, g | | | | Observations | | |
|---|---|---|---|---|---|---|---|
| | | Acetyl Triethyl | | Tergitol | | | RT |
| Example | HAN | Citrate | Toluene | 15-S-3 | Initial | At −40° C. | After −40° C. |
| | | Propylene Glycol Diacetate | | | | | |
| 150 | 43.30 | 41.30 | 0 | 3 | Hazy liquid | Cloudy liquid | Opaque liquid |
| 151 | 44.80 | 42.80 | 0 | 0 | Hazy liquid | Cloudy liquid | Opaque liquid |
| 152 | 33.48 | 31.98 | 22.15 | 0 | Clear liquid | Clear liquid | Cloudy liquid |

Examples 153-156

Using the General Procedure, ester compounds and solvent blends were varied with a blend of Polymer 1 and Polymer 2. The −40° C. flowability of a PIC compositions prepared from a physical blend of these two polymers were found to vary by ratio of the polymers, chemical structure of the ester compound, and the ratio of ester compound to solvent. Further, the presence of surfactant was found, in some embodiments, to stabilize the PIC composition during warming after exposure to −40° C., for example by preventing phase separation of liquids and solids during warming.

Results for PIC compositions exhibiting flow characteristics at −40° C. are shown in Table 7.

TABLE 7

Compositions and observed results for Examples 153-156.

| | | Component, g | | | | | Observations | |
|---|---|---|---|---|---|---|---|---|
| | | Triethyl Acetyl | | | | | | RT |
| Ex. | HAN | Citrate | | Polymer 1 | Polymer 2 | Initial | −40° C. | After −40° C. |
| 153 | 64.62 | 21.54 | | 10.71 | 3.13 | Barely hazy liquid | Clear flowing gel | Barely hazy liquid |
| | HAN | Dimethyl Glutarate | | Polymer 1 | Polymer 2 | | | |
| 154 | 43.08 | 43.08 | | 10.71 | 3.13 | Hazy liquid | Cloudy liquid | Cloudy liquid |
| | HAN | Propylene Glycol Diacetate | Tergitol 15-S-3 | Polymer 1 | Polymer 2 | | | |
| 155 | 41.58 | 41.58 | 3 | 10.71 | 3.13 | Clear liquid | Cloudy liquid | Cloudy liquid |
| | HAN | Propylene Glycol Methyl Ether Acetate | | Polymer 1 | Polymer 6 | | | |
| 156 | 43.30 | 43.30 | 0 | 7.14 | 6.25 | Clear liquid | Opaque liquid | Opaque liquid |

Example 157-275

Using the General Procedure, 1.45 g of Polymer 4 was blended with the components and in the amounts shown in Table 8. Results of testing are shown in Table 8.

TABLE 8

Compositions and observations for Examples 157-275.

| | Component, g | | | | Observations | | |
|---|---|---|---|---|---|---|---|
| | | | | | RT | RT 48 Hours | RT 1 Week |
| Ex. | HAN | Toluene | Initial | At −40° C. | After −40° C. | After −40° C. | After −40° C. |
| 157 | 8.55 | 0 | Clear liquid | Cloudy Solid | Hazy Liquid | Hazy liquid | Hazy liquid |
| 158 | 6.41 | 2.14 | Clear liquid | Cloudy Solid | Hazy Liquid | Hazy liquid | Hazy liquid |
| 159 | 4.28 | 4.28 | Clear liquid | Cloudy Solid | Hazy Liquid | Hazy liquid | Hazy liquid |
| 160 | 2.14 | 6.41 | Clear liquid | Cloudy Solid | Clear Liquid | Clear Liquid | Hazy liquid |
| 161 | 0 | 8.55 | Clear liquid | Cloudy Solid | Clear Liquid | Clear Liquid | Clear Liquid |
| | HAN | Butyl Carbitol | | | | | |
| 162 | 6.41 | 2.14 | Clear liquid | Cloudy Solid | Hazy Liquid | Hazy Liquid | Hazy Liquid |
| 163 | 4.28 | 4.28 | Hazy liquid | Cloudy Solid | Cloudy Gel | Cloudy solid | Cloudy solid |
| 164 | 2.14 | 6.41 | Cloudy Liquid-Homogeneous | Cloudy Slush-Homogeneous | Cloudy Liquid-Homogeneous | Clear liquid-top, Cloudy gel-bottom | Clear liquid-top, Cloudy gel-bottom |
| 165 | 0 | 8.55 | Cloudy Liquid-Homogeneous | Cloudy Liquid-Homogeneous | Cloudy Liquid-Homogeneous | Clear liquid-top, cloudy liquid-bottom | Clear liquid-top, cloudy liquid-bottom |
| | HAN | 2,2,4-Trimethyl-1,3-pentanediol | | | | | |
| 166 | 6.41 | 2.14 | Clear liquid | Cloudy Solid | Hazy Liquid | Hazy liquid-slight precipitate at bottom | Hazy liquid-slight precipitate at bottom |
| 167 | 4.28 | 4.28 | Clear liquid | Cloudy Solid | Cloudy Liquid-Homogeneous | Hazy liquid-slight cloudy gel at bottom | Hazy liquid-slight cloudy gel at bottom |
| 168 | 2.14 | 6.41 | Cloudy Liquid-Homogeneous | Cloudy Solid | Cloudy Gel | Cloudy solid | Cloudy solid |
| 169 | 0 | 8.55 | Cloudy Liquid-Homogeneous | Cloudy Solid | Cloudy Liquid-Homogeneous | Cloudy Liquid-Homogeneous | Cloudy liquid-slight separation |
| | HAN | Propylene Glycol Diacetate | | | | | |
| 170 | 6.41 | 2.14 | Clear liquid | Cloudy Solid | Hazy Liquid | Hazy liquid-slight precipitate at bottom | Hazy liquid-slight precipitate at bottom |
| 171 | 4.28 | 4.28 | Cloudy Liquid-Homogeneous | Cloudy Liquid-Homogeneous | Cloudy Liquid-Homogeneous | Cloudy liquid-Homogeneous | Cloudy liquid-slight separation |
| 172 | 2.14 | 6.41 | Cloudy liquid-solid top layer | Cloudy liquid-solid top layer | Multiple layers-cloudy/clear | Cloudy liquid-top, clear liquid-bottom | Cloudy liquid-top, clear liquid-bottom |
| 173 | 0 | 8.55 | Cloudy liquid-solid top layer | Cloudy Liquid-solid top layer | Multiple layers-cloudy/clear | Cloudy liquid-top, clear liquid-bottom | Cloudy liquid-top, clear liquid-bottom |
| | HAN | Triacetin | | | | | |
| 174 | 6.41 | 2.14 | Clear liquid | Cloudy Solid | Multiple layers-cloudy/clear | Cloudy liquid-top, clear liquid-bottom | Cloudy liquid-top, clear liquid-bottom |
| 175 | 4.28 | 4.28 | Clear liquid-two layers | Cloudy Solid | Multiple layers-cloudy/clear | Cloudy liquid-top, clear liquid-bottom | Cloudy liquid-top, clear liquid-bottom |
| 176 | 2.14 | 6.41 | Clear liquid-solid top layer | Cloudy Solid | Multiple layers-cloudy/clear | Cloudy solid-top, clear liquid-bottom | Cloudy solid-top, clear liquid-bottom |

TABLE 8-continued

Compositions and observations for Examples 157-275.

| | Component, g | | | | Observations | | |
|---|---|---|---|---|---|---|---|
| | | | | | RT | RT 48 Hours | RT 1 Week |
| Ex. | HAN | Toluene | Initial | At −40° C. | After −40° C. | After −40° C. | After −40° C. |
| 177 | 0 | 8.55 | Cloudy liquid-two layers | Cloudy Solid | Multiple layers-cloudy/clear | Cloudy solid-top, clear liquid-bottom | Cloudy solid-top, clear liquid-bottom |
| | HAN | Triethyl 2-Acetylcitrate | | | | | |
| 178 | 6.41 | 2.14 | Clear liquid | Cloudy Solid | Cloudy liquid | Hazy liquid-slight precipitate at bottom | Hazy liquid-slight precipitate at bottom |
| 179 | 4.28 | 4.28 | Hazy liquid-two layers | Solid-two layers | Cloudy liquid top layer-Clear liquid bottom layer | Clear liquid bottom-cloudy liquid top | Clear liquid bottom-cloudy liquid top |
| 180 | 2.14 | 6.41 | Cloudy liquid-solid top layer | Solid-two layers | Cloudy liquid top layer-Clear liquid bottom layer | Clear liquid bottom-cloudy liquid top | Clear liquid bottom-cloudy liquid top |
| 181 | 0 | 8.55 | Cloudy liquid-solid top layer | Solid-two layers | Cloudy liquid top layer-Clear liquid bottom layer | Clear liquid bottom-cloudy liquid top | Clear liquid bottom-cloudy liquid top |
| | HAN | Dipropylene Glycol Methyl Ether Acetate | | | | | |
| 182 | 6.41 | 2.14 | Clear liquid | Cloudy Solid | Hazy Liquid | Hazy liquid-slight precipitate at bottom | Hazy liquid-slight precipitate at bottom |
| 183 | 4.28 | 4.28 | Clear liquid | Cloudy Solid | Cloudy liquid | Cloudy solid | Cloudy solid |
| 184 | 2.14 | 6.41 | Cloudy liquid-Homogeneous | Cloudy liquid-Homogeneous | Cloudy liquid | Cloudy liquid-two phase | Cloudy liquid-two phase |
| 185 | 0 | 8.55 | Cloudy liquid-Homogeneous | Cloudy liquid-Homogeneous | Cloudy liquid-Homogeneous | Cloudy liquid-Homogeneous | Cloudy liquid-Homogeneous |
| | HAN | Propylene Glycol Methyl Ether Acetate | | | | | |
| 186 | 6.41 | 2.14 | Clear liquid | Cloudy Solid | Hazy Liquid | Hazy liquid-slight precipitate at bottom | Hazy liquid-slight precipitate at bottom |
| 187 | 4.28 | 4.28 | Clear liquid | Cloudy Solid | Cloudy liquid-Homogeneous | Cloudy solid | Cloudy solid |
| 188 | 2.14 | 6.41 | Cloudy liquid-Homogeneous | Cloudy liquid-Homogeneous | Cloudy liquid-Homogeneous | Cloudy liquid-two phase | Cloudy liquid-two phase |
| 189 | 0 | 8.55 | Cloudy liquid-Homogeneous | Cloudy liquid-Homogeneous | Cloudy liquid-Homogeneous | Cloudy liquid-Homogeneous | Cloudy liquid-two phase |
| | HAN | Butyl Carbitol Acetate | | | | | |
| 190 | 6.41 | 2.14 | Clear liquid | Cloudy Solid | Cloudy liquid-Homogeneous | Hazy liquid-slight precipitate at bottom | Hazy liquid-slight precipitate at bottom |
| 191 | 4.28 | 4.28 | Clear liquid | Cloudy Solid | Cloudy liquid-Homogeneous | Cloudy solid | Cloudy solid |
| 192 | 2.14 | 6.41 | Cloudy liquid-Homogeneous | Cloudy liquid-Homogeneous | Cloudy liquid-Homogeneous | Cloudy liquid-two phase | Cloudy liquid-two phase |
| 193 | 0 | 8.55 | Cloudy liquid-Homogeneous | Cloudy liquid-Homogeneous | Cloudy liquid-Homogeneous | Cloudy liquid-Homogeneous | Cloudy liquid-Homogeneous |

TABLE 8-continued

Compositions and observations for Examples 157-275.

| | Component, g | | | | Observations | | |
|---|---|---|---|---|---|---|---|
| Ex. | HAN | Toluene | Initial | At −40° C. | RT After −40° C. | RT 48 Hours After −40° C. | RT 1 Week After −40° C. |
| | HAN | Butyl Cellosolve Acetate | | | | | |
| 194 | 6.41 | 2.14 | Clear liquid | Cloudy Solid | Cloudy liquid-Homogeneous | Hazy liquid-slight precipitate at bottom | Cloudy liquid-two phase |
| 195 | 4.28 | 4.28 | Clear liquid | Cloudy Solid | Cloudy liquid-Homogeneous | Cloudy Solid | Cloudy Solid |
| 196 | 2.14 | 6.41 | Hazy liquid | Cloudy Solid | Cloudy liquid-Homogeneous | Cloudy Solid | Cloudy Solid |
| 197 | 0 | 8.55 | Cloudy liquid-Homogeneous | Cloudy liquid-Homogeneous | Cloudy liquid-Homogeneous | Cloudy liquid-Homogeneous | Cloudy liquid-two phase |
| | HAN | Diisononyl Adipate | | | | | |
| 198 | 6.41 | 2.14 | Clear liquid | Cloudy Solid | Cloudy liquid-Homogeneous | Hazy liquid-slight precipitate at bottom | Hazy liquid-slight precipitate at bottom |
| 199 | 4.28 | 4.28 | Clear liquid | Cloudy Solid | Cloudy liquid-Homogeneous | Cloudy Solid | Cloudy Solid |
| 200 | 2.14 | 6.41 | Clear liquid | Cloudy Solid | Cloudy liquid-Homogeneous | Cloudy Solid | Cloudy Solid |
| 201 | 0 | 8.55 | Cloudy solid | Cloudy Solid | Cloudy liquid-Homogeneous | Cloudy Solid | Cloudy Solid |
| | HAN | Tributyl 2-acetylcitrate | | | | | |
| 202 | 6.41 | 2.14 | Clear liquid | Cloudy Solid | Hazy Liquid | Hazy liquid-slight precipitate at bottom | Hazy liquid-precipitate at bottom |
| 203 | 4.28 | 4.28 | Clear liquid | Cloudy Solid | Opaque Gel | Opaque Gel | Opaque Gel |
| 204 | 2.14 | 6.41 | Hazy liquid | Cloudy liquid-Homogeneous | Cloudy liquid-Homogeneous | Cloudy Liquid-two phase | Cloudy Liquid-two phase |
| 205 | 0 | 8.55 | Cloudy solid | Cloudy Solid | Cloudy liquid-solid top layer | Cloudy Liquid-two phase | Cloudy Liquid-solid top layer |
| | HAN | Ethyl L-lactate | | | | | |
| 206 | 6.41 | 2.14 | Clear liquid | Cloudy Solid | Hazy Liquid | Hazy Liquid | Hazy Liquid |
| 207 | 4.28 | 4.28 | Hazy liquid | Cloudy Solid | Cloudy liquid-Homogeneous | Cloudy liquid-two phase | Cloudy liquid-two phase |
| 208 | 2.14 | 6.41 | Cloudy liquid-Homogeneous | Cloudy liquid-solid top layer | Cloudy liquid-solid top layer-clear bottom layer | Cloudy liquid-solid top layer-clear bottom layer | Cloudy liquid-solid top layer-clear bottom layer |
| 209 | 0 | 8.55 | Cloudy liquid-solid top layer | Cloudy Solid | Cloudy liquid top-clear liquid bottom | Cloudy liquid-solid top layer-clear bottom layer | Cloudy liquid-solid top layer-clear bottom layer |
| | HAN | Glycol Ether Acetate | | | | | |
| 210 | 6.41 | 2.14 | Clear liquid | Cloudy Solid | Hazy Liquid | Hazy liquid-slight precipitate at bottom | Hazy liquid-precipitate at bottom |
| 211 | 4.28 | 4.28 | Clear liquid | Cloudy Solid | Cloudy Solid | Cloudy Solid | Cloudy Solid |
| 212 | 2.14 | 6.41 | Cloudy liquid-Homogeneous | Cloudy liquid-Homogeneous | Cloudy liquid-Homogeneous | Cloudy liquid-Homogeneous | Cloudy liquid bottom layer, clear liquid top layer |

TABLE 8-continued

Compositions and observations for Examples 157-275.

| | Component, g | | | | Observations | | |
|---|---|---|---|---|---|---|---|
| | | | | | RT | RT 48 Hours | RT 1 Week |
| Ex. | HAN | Toluene | Initial | At −40° C. | After −40° C. | After −40° C. | After −40° C. |
| 213 | 0 | 8.55 | Cloudy liquid-Homogeneous | Cloudy liquid-Homogeneous | Cloudy liquid-Homogeneous | Cloudy liquid-Homogeneous | Cloudy liquid-Homogeneous |
| | HAN | Butyl Lactate | | | | | |
| 214 | 6.41 | 2.14 | Clear liquid | Cloudy Solid | Cloudy liquid-Homogeneous | Cloudy liquid-Homogeneous | Hazy Liquid |
| 215 | 4.28 | 4.28 | Clear liquid | Cloudy Solid | Cloudy Gel | Cloudy Gel | Cloudy Gel |
| 216 | 2.14 | 6.41 | Cloudy liquid-Homogeneous | Cloudy liquid-Homogeneous | Cloudy liquid-Homogeneous | Cloudy liquid-Homogeneous | Cloudy liquid bottom layer, clear liquid top layer |
| 217 | 0 | 8.55 | Cloudy slush-Homogeneous | Cloudy slush-Homogeneous | Cloudy liquid-Homogeneous | Cloudy liquid-Homogeneous | Cloudy liquid-Homogeneous |
| | HAN | Toluene | | | | | |
| 218 | 8.55 | 0 | Clear liquid | Hazy Solid | Clear liquid-slight precipitate at bottom | Clear liquid-slight precipitate at bottom | n/a |
| 219 | 6.41 | 2.14 | Clear liquid | Hazy Solid | Clear liquid-slight precipitate at bottom | Clear liquid-slight precipitate at bottom | n/a |
| 220 | 4.28 | 4.28 | Clear liquid | Hazy Solid | Clear liquid-slight precipitate at bottom | Clear liquid-slight precipitate at bottom | n/a |
| 221 | 2.14 | 6.41 | Clear liquid | Hazy Solid | Clear liquid-slight precipitate at bottom | Clear liquid-slight precipitate at bottom | n/a |
| 222 | 0 | 8.55 | Clear liquid | Hazy Solid | Clear liquid-slight precipitate at bottom | Clear liquid-slight precipitate at bottom | n/a |
| | HAN | Propylene glycol methyl ether acetate | | | | | |
| 223 | 6.41 | 2.14 | Clear liquid | Hazy Solid | Hazy gel | Hazy gel | n/a |
| 224 | 4.28 | 4.28 | Clear liquid | Cloudy Solid | Cloudy solid | Cloudy solid | n/a |
| 225 | 2.14 | 6.41 | Cloudy liquid-Homogeneous | Cloudy Solid | Cloudy liquid-Homogeneous | Cloudy liquid-Homogeneous | n/a |
| 226 | 0 | 8.55 | Cloudy liquid-Homogeneous | Cloudy thick liquid-Homogenous | Cloudy liquid-Homogeneous | Cloudy liquid-Homogeneous | n/a |
| | HAN | Butyl Lactate | | | | | |
| 227 | 6.41 | 2.14 | Clear liquid | Hazy Solid | Hazy liquid | Hazy liquid | n/a |
| 228 | 4.28 | 4.28 | Clear liquid | Cloudy Solid | Hazy solid | Hazy solid | n/a |
| 229 | 2.14 | 6.41 | Cloudy liquid-Homogeneous | Cloudy Solid | Cloudy liquid-Homogeneous | Cloudy liquid-Homogeneous | n/a |
| 230 | 0 | 8.55 | Cloudy liquid-Homogeneous | Cloudy Solid | Cloudy liquid-Homogeneous | Cloudy liquid-Homogeneous | n/a |
| | HAN | Butyl Carbitol | | | | | |
| 231 | 6.41 | 2.14 | Clear liquid | Hazy Solid | Clear liquid | Clear liquid | n/a |
| 232 | 4.28 | 4.28 | Clear liquid | Cloudy Solid | Cloudy Solid | Cloudy Solid | n/a |
| 233 | 2.14 | 6.41 | Cloudy Liquid-Homogeneous | Cloudy Solid | Cloudy Gel | Clear liquid-top, cloudy liquid-bottom | n/a |

TABLE 8-continued

Compositions and observations for Examples 157-275.

| | Component, g | | | | Observations | | |
|---|---|---|---|---|---|---|---|
| | | | | | RT | RT 48 Hours | RT 1 Week |
| Ex. | HAN | Toluene | Initial | At −40° C. | After −40° C. | After −40° C. | After −40° C. |
| 234 | 0 | 8.55 | Cloudy Liquid-Homogeneous | Cloudy Liquid-Homogeneous | Cloudy liquid-Homogeneous | Clear liquid-top, cloudy liquid-bottom | n/a |
| | HAN | Propylene Glycol Diacetate | | | | | |
| 235 | 6.41 | 2.14 | Clear liquid | Cloudy Solid | Hazy Gel | Hazy Gel | n/a |
| 236 | 4.28 | 4.28 | Cloudy liquid-Homogeneous | Cloudy thick liquid | Cloudy liquid-Homogeneous | Cloudy liquid-Homogeneous | n/a |
| 237 | 2.14 | 6.41 | Cloudy liquid-Homogeneous | Cloudy liquid-solid top layer | Cloudy liquid-solid top layer | Cloudy liquid-solid top layer | n/a |
| 238 | 0 | 8.55 | Cloudy liquid-Homogeneous | Cloudy Solid | Cloudy liquid-solid top layer | Cloudy liquid-solid top layer | n/a |
| | HAN | Dipropylene Glycol Methyl Ether Acetate | | | | | |
| 239 | 6.41 | 2.14 | Clear liquid | Hazy Solid | Clear liquid | Hazy Gel | n/a |
| 240 | 4.28 | 4.28 | Clear liquid | Cloudy Solid | Cloudy solid | Cloudy solid | n/a |
| 241 | 2.14 | 6.41 | Cloudy liquid-Homogeneous | Cloudy Solid | Cloudy liquid-Homogeneous | Cloudy liquid-Homogeneous | n/a |
| 242 | 0 | 8.55 | Cloudy liquid-Homogeneous | Cloudy think liquid-Homogeneous | Cloudy liquid-Homogeneous | Cloudy liquid-Homogeneous | n/a |
| | Toluene | PMA Glycol Ether Acetate | | | | | |
| 243 | 6.41 | 2.14 | Clear liquid | Cloudy Solid | Hazy liquid | Hazy liquid-slight precipitate at bottom | n/a |
| 244 | 4.28 | 4.28 | Hazy liquid | Cloudy Solid | Cloudy gel | Cloudy gel | n/a |
| 245 | 2.14 | 6.41 | Cloudy liquid-Homogeneous | Cloudy Solid | Cloudy liquid-Homogeneous | Cloudy liquid-Homogeneous | n/a |
| 246 | 0 | 8.55 | Cloudy liquid-Homogeneous | Cloudy liquid-Homogeneous | Cloudy liquid-Homogeneous | Cloudy liquid-Homogeneous | n/a |
| | Toluene | Butyl Lactate | | | | | |
| 247 | 6.41 | 2.14 | Clear liquid | Cloudy Solid | Hazy liquid-slight precipitate at bottom | Hazy liquid-slight precipitate at bottom | n/a |
| 248 | 4.28 | 4.28 | Hazy liquid | Cloudy Solid | Cloudy gel | Cloudy gel | n/a |
| 249 | 2.14 | 6.41 | Cloudy liquid-Homogeneous | Cloudy Slush | Cloudy liquid-Homogeneous | Cloudy liquid-Homogeneous | n/a |
| 250 | 0 | 8.55 | Cloudy liquid-Homogeneous | Cloudy Slush | Cloudy liquid-Homogeneous | Cloudy liquid-Homogeneous | n/a |
| | Toluene | Butyl Carbitol | | | | | |
| 251 | 6.41 | 2.14 | Clear liquid | Cloudy Solid | Hazy liquid | Hazy liquid | n/a |
| 252 | 4.28 | 4.28 | Hazy liquid | Cloudy Solid | Cloudy liquid-Homogeneous | Cloudy liquid-Homogeneous | n/a |
| 253 | 2.14 | 6.41 | Cloudy liquid-Homogeneous | Cloudy slush | Cloudy liquid-Homogeneous | Cloudy liquid-slight separation | n/a |
| 254 | 0 | 8.55 | Cloudy liquid-Homogeneous | Cloudy slush | Cloudy liquid-Homogeneous | Cloudy liquid-Homogeneous | n/a |

TABLE 8-continued

Compositions and observations for Examples 157-275.

| | Component, g | | | | Observations | | |
|---|---|---|---|---|---|---|---|
| | | | | | RT | RT 48 Hours | RT 1 Week |
| Ex. | HAN | Toluene | Initial | At −40° C. | After −40° C. | After −40° C. | After −40° C. |
| | Toluene | Propylene Glycol Diacetate | | | | | |
| 255 | 6.41 | 2.14 | Clear liquid | Cloudy solid | Hazy Gel | Hazy Gel | n/a |
| 256 | 4.28 | 4.28 | Hazy liquid-solid top layer | Cloudy solid | Cloudy liquid-solid top layer | Cloudy liquid-solid top layer | n/a |
| 257 | 2.14 | 6.41 | Cloudy liquid-solid top layer | Cloudy solid | Cloudy liquid-solid top layer | Cloudy liquid-solid top layer | n/a |
| 258 | 0 | 8.55 | Cloudy liquid-solid top layer | Cloudy solid | Cloudy liquid-solid top layer | Cloudy liquid-solid top layer | n/a |
| | Toluene | Dipropylene Glycol Methyl Ether Acetate | | | | | |
| 259 | 6.41 | 2.14 | Clear liquid | Cloudy solid | Hazy liquid | Hazy liquid | n/a |
| 260 | 4.28 | 4.28 | Hazy liquid | Cloudy solid | Cloudy solid | Cloudy solid | n/a |
| 261 | 2.14 | 6.41 | Cloudy liquid-Homogeneous | Cloudy slush | Cloudy liquid-Homogeneous | Cloudy liquid-Homogeneous | n/a |
| 262 | 0 | 8.55 | Cloudy liquid-Homogeneous | Cloudy liquid-Homogeneous | Cloudy liquid-Homogeneous | Cloudy liquid-Homogeneous | n/a |
| | HAN | PMA Glycol Ether Acetate | | | | | |
| 263 | 8.05 | 0.50 | Clear liquid | Clear solid | Hazy Liquid | Hazy Liquid | n/a |
| 264 | 7.55 | 1.00 | Clear liquid | Clear solid | Hazy Liquid | Hazy Liquid | n/a |
| | HAN | Butyl Lactate | | | | | |
| 265 | 8.05 | 0.50 | Clear liquid | Clear solid | Hazy Liquid | Hazy Liquid | n/a |
| 266 | 7.55 | 1.00 | Clear liquid | Clear solid | Hazy Liquid | Hazy Liquid | n/a |
| | HAN | Butyl Carbitol | | | | | |
| 267 | 8.05 | 0.50 | Clear liquid | Clear solid | Hazy Liquid | Hazy Liquid | n/a |
| 268 | 7.55 | 1.00 | Clear liquid | Clear solid | Hazy Liquid | Hazy Liquid | n/a |
| | HAN | Propylene Glycol Diacetate | | | | | |
| 269 | 8.05 | 0.50 | Clear liquid | Clear solid | Hazy Liquid | Hazy Liquid | n/a |
| 270 | 7.55 | 1.00 | Clear liquid | Clear solid | Hazy Liquid | Hazy Liquid | n/a |
| | HAN | Dipropylene Glycol Methyl Ether Acetate | | | | | |
| 271 | 8.05 | 0.50 | Clear liquid | Clear solid | Hazy Liquid | Hazy Liquid | n/a |
| 272 | 7.55 | 1.00 | Clear liquid | Clear solid | Hazy Liquid | Hazy Liquid | n/a |
| | Toluene | none | | | | | |
| 273 | 8.55 | n/a | Clear liquid | Clear solid | Clear liquid | Clear liquid | n/a |
| | HAN | none | | | | | |
| 274 | 8.55 | n/a | Clear liquid | Clear solid | Hazy Liquid | Hazy Liquid | n/a |

TABLE 8-continued

Compositions and observations for Examples 157-275.

| | Component, g | | | Observations | | | |
|---|---|---|---|---|---|---|---|
| Ex. | HAN | Toluene | Initial | At −40° C. | RT After −40° C. | RT 48 Hours After −40° C. | RT 1 Week After −40° C. |
| | HAN | none | | | | | |
| 275 | 8.55 | n/a | Clear liquid | Clear solid | Clear liquid | Clear liquid | n/a |

Examples 276-279

Using the General Procedure, 1.4 g of Polymer 3 was blended with the components and in the amounts shown in Table 9. Examples 276 and 277 were solid at −40° C., while Examples 278 and 279 were pourable liquids at −40° C.

TABLE 9

Compositions of Examples 276-279.

| Ex. | Solvent 195 | Ethylene glycol butyl ether acetate | Propylene glycol methyl ether acetate |
|---|---|---|---|
| 276 | 3.6 | 5.0 | |
| 277 | | 8.6 | |
| 278 | 3.6 | | 5.0 |
| 279 | | | 8.6 |

Examples 280-301

Using the General Procedure, the indicated polymers were mixed with Solvent 195 (SOLVESSO® 195, obtained from ExxonMobil Chemical Co. of Irving, Tex.) using varying amounts of ethylene glycol butyl ether acetate, and the mixtures tested according to the General Procedure except that all the compositions were solids at −40° C. and the amount of time between taking the bottle out of the freezer and subjecting it to ambient laboratory temperature and the time that the composition begins to flow is noted in seconds. DBS is a dodecylbenzenesulfonic acid salt. The mixtures of Examples 280-301 were observed solely after mixing followed by 18 hours storage at −40° C. Compositions and results are shown in Table 10.

TABLE 10

Compositions and time to flow for the compositions of Examples 280-301.

| | Component, g | | | | | | | | Observation |
|---|---|---|---|---|---|---|---|---|---|
| Ex. | Polymer 3 | Polymer 1 | Polymer 2 | Polymer 6 | Polymer 5 | Solvent 195 | Ethylene glycol butyl ether acetate | DBS | Time to flow, s after −40° C. |
| 280 | 1.45 | | | | 0.05 | 7.70 | 0.50 | 0.30 | 103 |
| 281 | 1.45 | | | | 0.05 | 6.70 | 1.50 | 0.30 | 106 |
| 282 | 1.45 | | 0.05 | | | 6.70 | 1.50 | 0.30 | 109 |
| 283 | 1.45 | | | | 0.05 | 6.70 | 1.50 | 0.30 | 109 |
| 284 | 1.45 | | 0.05 | | | 6.70 | 1.50 | 0.30 | 114 |
| 285 | 1.45 | | 0.05 | | | 7.70 | 0.50 | 0.30 | 117 |
| 286 | 1.45 | | | 0.05 | | 7.70 | 0.50 | 0.30 | 127 |
| 287 | 1.45 | | | 0.05 | | 6.70 | 1.50 | 0.30 | 134 |
| 288 | 1.45 | | 0.05 | | | 5.20 | 3.00 | 0.30 | 151 |
| 289 | 1.45 | | | | 0.05 | 5.20 | 3.00 | 0.30 | 159 |
| 290 | 1.45 | | | 0.05 | | 5.20 | 3.00 | 0.30 | 177 |
| 291 | | 1.45 | | | 0.05 | 7.70 | 0.50 | 0.30 | 194 |
| 292 | | 1.45 | 0.05 | | | 7.70 | 0.50 | 0.30 | 227 |
| 293 | | 1.45 | | | 0.05 | 6.70 | 1.50 | 0.30 | 232 |
| 294 | | 1.45 | 0.05 | | | 6.70 | 1.50 | 0.30 | 266 |
| 295 | | 1.45 | | 0.05 | | 7.70 | 0.50 | 0.30 | 272 |
| 296 | | 1.45 | | | 0.05 | 5.20 | 3.00 | 0.30 | 324 |
| 297 | | 1.45 | 0.05 | | | 5.20 | 3.00 | 0.30 | 328 |
| 298 | | 1.45 | | 0.05 | | 5.20 | 3.00 | 0.30 | 329 |
| 299 | | 1.45 | | 0.05 | | 6.70 | 1.50 | 0.30 | 344 |
| 300 | | 1.45 | | 0.05 | | 6.70 | 1.50 | 0.30 | 369 |
| 301 | | 1.45 | | 0.05 | | 5.20 | 3.00 | 0.30 | 417 |

Examples 302-321

The components shown in Table 11 were mixed according to the General Procedure. Note that all components are described fully above. All of the mixtures were observed to be clear or hazy liquids upon initial observation. Then the example mixtures were subjected to stability cycling according to the following protocol in the indicated order: 1st cold cycle; 1st heat cycle; 2nd cold cycle, 2nd heat cycle, 3rd cold cycle; 3rd heat cycle; 4th cold cycle, wherein the protocol for each of the cooling and heating cycles were carried out according to the General Procedure. The results of the observations during the stability cycling is shown in Table 12.

TABLE 11

Components of Examples 302-321.

Component, g

| Ex. | HAN | Acetyl Triethyl Citrate | Toluene | Tergitol 15-S-3 | Polymer 2 |
|---|---|---|---|---|---|
| 302 | 53.80 | 33.80 | 0.00 | 0 | 12.4 |
| 303 | 33.48 | 31.98 | 22.15 | 0 | 12.4 |

Triacetin

| 304 | 37.23 | 25.23 | 22.15 | 0 | 12.4 |
| 305 | 33.48 | 31.98 | 22.15 | 0 | 12.4 |

Propylene Glycol Diacetate

| 306 | 43.30 | 41.30 | 0.00 | 3 | 12.4 |
| 307 | 44.80 | 42.80 | 0.00 | 0 | 12.4 |
| 308 | 33.48 | 31.98 | 22.15 | 0 | 12.4 |

Acetyl Triethyl Citrate

| 309 | 52.30 | 32.30 | 0.00 | 3 | 12.4 |
| 310 | 32.48 | 30.98 | 21.15 | 3 | 12.4 |

Triacetin

| 311 | 39.23 | 24.23 | 21.15 | 3 | 12.4 |

| | | Acetyl Triethyl Citrate | Solvent 150 | | |
| 312 | 52.30 | 32.30 | 0.00 | 3 | 12.4 |

Triacetin

| 313 | 39.23 | 24.23 | 21.15 | 3 | 12.4 |

Toluene

| 314 | 24.23 | 60.38 | | 3 | 12.4 |

Propylene Glycol Diacetate

| 315 | 30.98 | 53.63 | | 3 | 12.4 |

| | | Solvent 150 | Acetyl Triethyl Citrate | | |
| 316 | 52.30 | 32.30 | 0.00 | 3 | 12.4 |
| 317 | 32.48 | 30.98 | 21.15 | 3 | 12.4 |

Triacetin

| 318 | 39.23 | 24.23 | 21.15 | 3 | 12.4 |

| | | Solvent 195 | Acetyl Triethyl Citrate | | |
| 319 | 52.30 | 32.30 | 0.00 | 3 | 12.4 |

Triacetin

| 320 | 39.23 | 24.23 | 21.15 | 3 | 12.4 |

Solvent 150

| 321 | 40.23 | 25.23 | 22.15 | 0 | 12.4 |

TABLE 12

Observations regarding stability cycling of Examples 302-321.

| | 1st Cold Cycle | | 1st Heat Cycle | | 2nd Cold Cycle | | 2nd Heat Cycle | | 3rd Cold Cycle | | 3rd Heat Cycle | | 4th Cold Cycle | |
|---|---|---|---|---|---|---|---|---|---|---|---|---|---|---|
| Ex. | −40° C. | RT | +60° C. | RT | −40° C. | RT | +60° C. | RT | −40° C. | RT | +60° C. | RT | −40° C. | RT |
| 302 | Clear liquid | Cloudy liquid | Clear liquid | Slightly hazy liquid | Cloudy liquid | Cloudy liquid | Clear liquid | Slightly hazy liquid | Cloudy liquid | Cloudy liquid | Clear liquid | Barely hazy liquid | Opaque slush | Cloudy liquid |
| 303 | Clear liquid | Cloudy liquid | Clear liquid | Slightly hazy liquid | Clear solid | Cloudy liquid | Clear liquid | Slightly hazy liquid | Clear slow flowing liquid | Cloudy liquid | Clear liquid | Barely hazy liquid | Cloudy flowing gel | Cloudy liquid |
| 304 | Clear liquid | Hazy liquid | Clear liquid | Clear liquid | Clear liquid | Barely hazy liquid | Clear liquid | Clear liquid | Clear liquid | Hazy liquid | Clear liquid | Barely hazy liquid | Clear liquid | Hazy fluff over clear liquid |
| 305 | Clear solid over clear liquid | Chunky cloudy liquid | Clear liquid | Separated hazy liquid | Separated clear solid | Clear gel; cloudy fluff; hazy liquid | Clear liquid | Separated hazy liquid | Separated clear solid | Chunky hazy liquid | Clear liquid | Clear liquid over hazy liquid | Separated cloudy solid | Separated hazy liquid |

TABLE 12-continued

Observations regarding stability cycling of Examples 302-321.

| | 1st Cold Cycle | | 1st Heat Cycle | | 2nd Cold Cycle | | 2nd Heat Cycle | | 3rd Cold Cycle | | 3rd Heat Cycle | | 4th Cold Cycle | |
|---|---|---|---|---|---|---|---|---|---|---|---|---|---|---|
| Ex. | −40° C. | RT | +60° C. | RT | −40° C. | RT | +60° C. | RT | −40° C. | RT | +60° C. | RT | −40° C. | RT |
| 306 | Opaque liquid | Opaque liquid | Clear liquid | Hazy liquid | Slush | Opaque liquid | Clear liquid | Hazy liquid | Opaque liquid | Opaque liquid | Clear liquid | Cloudy liquid | Opaque solid | Settled cloudy liquid |
| 307 | Opaque liquid | Opaque liquid | Clear liquid | Hazy liquid | Clear solid | Chunky opaque liquid | Clear liquid | Separated hazy liquid | Separated opaque solid | Opaque solid over opaque liquid | Clear liquid | Chunky cloudy liquid | Opaque solid | Settled cloudy liquid |
| 308 | Clear liquid | Hazy liquid | Clear liquid | Clear liquid | Clear solid | Hazy liquid | Clear liquid | Clear liquid | Clear slow flowing liquid | Cloudy liquid | Clear liquid | Clear liquid | Cloudy flowing gel | Cloudy liquid |
| 309 | Clear liquid | Hazy liquid | Clear liquid | Clear liquid | Slush | Cloudy liquid | Clear liquid | Clear liquid | Clear slow flowing liquid | Cloudy liquid | Clear liquid | Clear liquid | Cloudy flowing gel | Cloudy liquid |
| 310 | Clear liquid | Hazy liquid | Clear liquid | Clear liquid | Slush | Cloudy liquid | Clear liquid | Clear liquid | Clear solid | Cloudy liquid | Clear liquid | Clear liquid | Cloudy flowing gel | Cloudy liquid |
| 311 | Clear liquid | Hazy liquid | Clear liquid | Clear liquid | Clear liquid | Clear liquid | Clear liquid | Clear liquid | Clear liquid | Hazy liquid | Clear liquid | Clear liquid | Clear liquid | Hazy fluff over clear liquid |
| 312 | Clear liquid | Hazy liquid | Clear liquid | Clear liquid | Clear solid | Cloudy liquid | Clear liquid | Clear liquid | Clear solid | Cloudy liquid | Clear liquid | Clear liquid | Cloudy flowing gel | Cloudy liquid |
| 313 | Clear liquid | Hazy liquid | Clear liquid | Clear liquid | Clear liquid | Barely hazy liquid | Clear liquid | Clear liquid | Clear liquid | Very hazy liquid | Clear liquid | Clear liquid | Clear liquid | Hazy fluff over clear liquid |
| 314 | Clear liquid | Barely hazy liquid | Clear liquid | Clear liquid | Cloudy liquid | Clear liquid | Clear liquid | Clear liquid | Clear liquid | Hazy liquid | Clear liquid | Clear liquid | Cloudy liquid; cloudy solid ring | Hazy fluff over clear liquid |
| 315 | Clear liquid | Cloudy liquid | Clear liquid | Clear liquid | Slush | Cloudy liquid | Clear liquid | Clear liquid | Clear slow flowing liquid | Opaque liquid | Clear liquid | Separated slightly hazy liquid | Opaque slush | Cloudy liquid |
| 316 | Clear liquid | Cloudy liquid | Clear liquid | Clear liquid | Clear solid | Cloudy liquid | Clear liquid | Clear liquid | Clear solid | Cloudy liquid | Clear liquid | Clear liquid | Cloudy flowing gel | Cloudy liquid |
| 317 | Clear liquid | Cloudy liquid | Clear liquid | Clear liquid | Clear solid | Cloudy liquid | Clear liquid | Clear liquid | Clear solid | Cloudy liquid | Clear liquid | Clear liquid | Cloudy flowing gel | Cloudy liquid |
| 318 | Clear liquid | Hazy liquid | Clear liquid | Clear liquid | Clear liquid | Clear liquid | Clear liquid | Clear liquid | Clear liquid | Hazy liquid | Clear liquid | Clear liquid | Clear liquid | Clear liquid |
| 319 | Opaque liquid | Barely hazy liquid | Clear liquid | Clear liquid | Opaque liquid | Clear liquid | Clear liquid | Clear liquid | Opaque liquid | Hazy liquid | Clear liquid | Clear liquid | Opaque liquid | Hazy fluff over clear liquid |
| 320 | Clear liquid | Clear liquid | Clear liquid | Clear liquid | Cloudy liquid | Clear liquid | Clear liquid | Clear liquid | Opaque liquid; opaque solid ring | Cloudy liquid | Clear liquid | Clear liquid | Opaque solid over opaque liquid | Hazy material in clear liquid |
| 321 | Cloudy liquid | Barely hazy liquid | Clear liquid | Clear liquid | Cloudy slush | Barely hazy liquid | Clear liquid | Clear liquid | Cloudy slush | Hazy liquid | Clear liquid | Clear liquid | Slow flowing cloudy gel | Clear liquid |

Working Examples 322-329

PIC compositions including the components listed in Table 13 were admixed and tested to determine solidification point. The alkylphenol formaldehyde resin used was Flozol 2252, obtained from Lubrizol, 5-20% solids, and was added to the formulations of examples 142-149 as received and not on the basis of weight percent actives. The balance of each of the PICS listed in Table 13 was toluene, xylene, or HAN.

TABLE 13

Components and observed solidification point of working examples 322-329.

| Working Example # | Alkyl phenol formaldehyde Resin (wt %) | Propylene glycol methyl ether acetate (wt %) | Propylene glycol diacetate (wt %) | Solidification Point (° C.) |
|---|---|---|---|---|
| 322 | 20 | 5 | 0 | >−20 |
| 323 | 20 | 10 | 0 | >−40 |
| 324 | 20 | 15 | 0 | >−40 |
| 325 | 20 | 0 | 5 | >−40 |
| 326 | 20 | 0 | 10 | >−40 |
| 327 | 20 | 0 | 15 | >−40 |
| 328 | 20 | 5 | 5 | >−40 |
| 329 | 20 | 10 | 10 | >−40 |

The formulations of working examples 322-329 all exhibited 20% to 80% inhibition in paraffin deposition when added in the range of 100-2000 ppm to waxy crude oil and tested for paraffin inhibition by cold finger test, when compared to the crude oil without addition of the working examples 332-339 (control). The cold finger test quantitates the amount of paraffin wax deposited from 30° C. crude oil placed on a 5° C. metal surface.

Working Examples 330-336

Mixtures including 0.7 wt % actives of an esterified $C_{20}$ or greater alpha olefin/maleic anhydride copolymer were formed with FLOZOL® 2252, an alkylphenol formaldehyde resin obtained from Lubrizol and the functionalized glycols as shown in Table 14. The working examples 330-336 were then subjected to the following temperature cycle: 1 day at −45° C., followed by 15 hours at 60° C., followed by 3 days at −45° C., followed by 15 hours at 60° C., followed by 3 days at −45° C., followed finally by 15 hours at 60° C. Working examples 331, 333, and 334 were observed to be stable, homogeneous liquids throughout the entirety of the temperature cycle.

TABLE 14

Components of working examples 330-336, along with 7 wt % actives of an esterified $C_{20}$ or greater alpha olefin/maleic anhydride copolymer.

| Working Example # | FLOZOL® 2252 (wt %) | Functionalized Glycol | Wt % Functionalized Glycol | Toluene (wt %) |
|---|---|---|---|---|
| 330 | 23 | Propylene glycol methyl ether acetate | 8 | 62 |
| 331 | 10 | Propylene glycol methyl ether acetate | 17 | 66 |
| 332 | 10 | Ethylene glycol di acetate | 8 | 75 |
| 333 | 12.3 | Ethylene glycol di acetate | 16 | 74 |
| 334 | 10 | Ethylene glycol di acetate | 20 | 63 |
| 335 | 10 | 2-Methyl propylene glycol acetate | 8 | 75 |
| 336 | 10 | 2-Methyl propylene glycol acetate | 16 | 67 |

Working Examples 337-346

A mixture including 7 wt % of esterified $C_{20}$ or greater alpha olefin/maleic anhydride copolymer (as supplied and not as actives) was formed by blending a 5 wt % actives solution of the polymer of in xylene with FLOZOL® 2252, propylene glycol methyl ether acetate, 2-pyridone, and toluene in the amounts indicated in Table 16. After mixing, the working examples were stored at 4.5 days at −45° C., followed by observation regarding whether the mixture was a liquid at that temperature. Observations are recorded in Table 16.

TABLE 15

Components of working examples 343-358, along with 7 wt % of esterified $C_{20}$ or greater alpha olefin/maleic anhydride copolymer as supplied, and observed results after storing the working examples at −45° C. for 4.5 days.

| Working Example # | FLOZOL® 2252 (g) | Propylene glycol methyl ether acetate (g) | 2-Pyridone (g) | Toluene (g) | Liquid after 4.5 d @−45° C.? |
|---|---|---|---|---|---|
| 337 | 23 | 8 | 0 | 62 | no |
| 338 | 10 | 17 | 0 | 66 | yes |
| 339 | 10 | 10 | 0 | 73 | no |
| 340 | 10 | 15 | 0 | 68 | yes |
| 341 | 10 | 20 | 0 | 63 | yes |
| 342 | 23 | 8 | 2 | 60 | no |
| 343 | 10 | 17 | 2 | 64 | no |
| 344 | 10 | 10 | 2 | 71 | no |
| 345 | 10 | 15 | 2 | 66 | no |
| 346 | 10 | 20 | 2 | 61 | no |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A composition comprising:
a nonpolymeric ester compound; and
about 1 wt % to 20 wt % of a paraffin inhibiting polymer;
wherein the composition is nonaqueous and flows at a temperature between about 0° C. and −40° C.; and
wherein the nonpolymeric ester compound comprises dipropylene glycol methyl ether acetate, propylene glycol methyl ether acetate, ethylene glycol butyl ether acetate, diethylene glycol butyl ether acetate, propylene glycol diacetate, or a mixture of two or more thereof, and
wherein the paraffin inhibiting polymer comprises an alkylphenol-formaldehyde copolymer and a copolymer comprising the residues of one or more alpha olefin monomers and a maleic anhydride monomer, the one or more alpha olefin monomers having the formula (I):

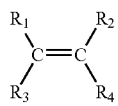

(I)

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

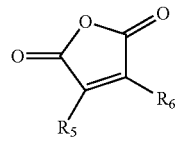

(II)

wherein $R_5$ and $R_6$ are independently selected from hydrogen or $C_1$-$C_{30}$ alkyl.

2. The composition of claim 1 further comprising a refined petroleum solvent.

3. The composition of claim 1 further comprising about 1 wt % to 5 wt % of a surfactant.

4. The composition of claim 3 wherein the surfactant comprises an alcohol alkoxylate, the alcohol comprising a linear, branched, aromatic, or alkaromatic hydrocarbyl group having about 8 to 30 carbons and the alkoxylate comprising about 3 to 70 alkoxylate repeat units.

5. The composition of claim 1 wherein the maleic anhydride residue is further reacted with about 0.01 to 2.0 equivalents of a $C_{12}$-$C_{60}$ alkanol or amine per equivalent of anhydride.

6. A method comprising:
forming a nonaqueous liquid composition comprising:
a nonpolymeric ester compound selected from dipropylene glycol methyl ether acetate, propylene glycol methyl ether acetate, ethylene glycol butyl ether acetate, diethylene glycol butyl ether acetate, propylene glycol diacetate, or a mixture of two or more thereof, and about 1 wt % to 20 wt % of a paraffin inhibiting polymer,
wherein the paraffin inhibiting polymer comprises an alkylphenol-formaldehyde copolymer and a copolymer comprising the residues of one or more alpha olefin monomers and a maleic anhydride monomer, the one or more alpha olefin monomers having the formula (I):

(I)

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

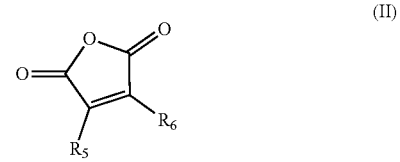

(II)

wherein $R_5$ and $R_6$ are independently selected from hydrogen or $C_1$-$C_{30}$ alkyl; storing the nonaqueous liquid composition in an enclosed container at a first temperature between about −40° C. and 60° C.;
removing the nonaqueous liquid composition from the container at a second temperature between about −40° C. and 60° C.; and
applying the nonaqueous liquid composition to a crude oil source,
wherein the removing and the applying are accomplished by pouring or by using a mechanical pump.

7. The method of claim 6 wherein the first temperature, the second temperature, or both are between about −40° C. and −20° C.

8. The method of claim 6 wherein the applying is applying of about 50 ppm to 10,000 ppm of the paraffin inhibiting polymer to the crude oil source.

9. A composition comprising:
a nonpolymeric ester compound and about 1 wt % to 20 wt % of a paraffin inhibiting polymer, wherein the composition is nonaqueous and flows at a temperature between about 0° C. and −40° C.; and wherein the nonpolymeric ester compound comprises a dipropylene glycol methyl ether acetate, propylene glycol methyl ether acetate, ethylene glycol butyl ether acetate, or diethylene glycol butyl ether acetate, propylene glycol diacetate, or a mixture of two or more thereof, and wherein the paraffin inhibiting polymer comprises a copolymer comprising the residues of one or more alpha olefin monomers and a maleic anhydride monomer, the one or more alpha olefin monomers having the formula (I):

(I)

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

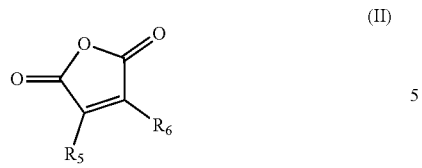
(II)

wherein $R_5$ and $R_6$ are independently selected from hydrogen or $C_1$-$C_{30}$ alkyl.

10. The composition of claim 9 wherein the nonpolymeric ester compound is a glycol diacetate or a blend of two or more thereof.

11. The composition of claim 9 wherein the nonpolymeric ester compound is selected from propylene glycol diacetate, propylene glycol methyl ether acetate, or a combination of two or more thereof.

* * * * *